US012129030B2

(12) United States Patent
Thomas

(10) Patent No.: US 12,129,030 B2
(45) Date of Patent: Oct. 29, 2024

(54) FIRE RESISTANT AERIAL VEHICLE FOR SUPPRESSING WIDESPREAD FIRES

(71) Applicant: Incaendium Initiative Corporation, Richmond, VT (US)

(72) Inventor: Michael S. Thomas, St. Albans, VT (US)

(73) Assignee: INCAENDIUM INITIATIVE CORPORATION, Rocky River, OH (US)

( * ) Notice: Subject to any disclaimer, the term of this patent is extended or adjusted under 35 U.S.C. 154(b) by 0 days.

(21) Appl. No.: 16/771,473

(22) PCT Filed: Dec. 14, 2018

(86) PCT No.: PCT/US2018/065816
§ 371 (c)(1),
(2) Date: Jun. 10, 2020

(87) PCT Pub. No.: WO2019/118908
PCT Pub. Date: Jun. 20, 2019

(65) Prior Publication Data
US 2021/0339866 A1    Nov. 4, 2021

Related U.S. Application Data

(60) Provisional application No. 62/598,602, filed on Dec. 14, 2017.

(51) Int. Cl.
*B64D 1/16*       (2006.01)
*A62C 3/02*       (2006.01)
(Continued)

(52) U.S. Cl.
CPC .............. *B64D 1/16* (2013.01); *A62C 3/0228* (2013.01); *A62C 37/00* (2013.01); *B64C 1/38* (2013.01);
(Continued)

(58) Field of Classification Search
CPC ......... B64D 1/16; A62C 3/0228; A62C 37/00; G05D 1/101; G01S 19/42; B64C 1/38;
(Continued)

(56) References Cited

U.S. PATENT DOCUMENTS 4,021,982 A    5/1977   Kotcharian
4,637,472 A    1/1987   Decima
(Continued)

FOREIGN PATENT DOCUMENTS

CN    103278331 A    9/2013
CN    205391536 U    7/2016
(Continued)

OTHER PUBLICATIONS

PCT International Search Report, dated Feb. 22, 2019 for Adaptive Global Solutions, LLC, International Application No. PCT/US2018/065816, filed Dec. 14, 2018.
(Continued)

*Primary Examiner* — Rodney A Bonnette
(74) *Attorney, Agent, or Firm* — Gesmer Updegrove LLP

(57) ABSTRACT

A concentric, double hull, damage tolerant airframe vehicle double clad with a lightweight, impact resistant ceramic matrix composite for heat shielding and flame resistance, and fitted with insulation, to provide thermal protection from 35° C. to 1,650° C. of the internal fuselage areas for an extended period of time within an extreme heat environment, that will serve as a semi or fully autonomous vehicle, manned or unmanned, preferably an unmanned aerial vehicle designed as the delivery means to suppress or extinguish flames by repeatedly discharging pressure waves against flames without having to exit the fire environment.

14 Claims, 8 Drawing Sheets

(51) Int. Cl.
  *A62C 37/00* (2006.01)
  *B64C 1/00* (2006.01)
  *B64C 1/38* (2006.01)
  *B64C 1/40* (2006.01)
  *B64C 9/00* (2006.01)
  *B64C 15/14* (2006.01)
  *B64C 19/02* (2006.01)
  *B64C 39/02* (2006.01)
  *B64U 20/60* (2023.01)
  *B64U 50/18* (2023.01)
  *B64U 50/34* (2023.01)
  *G01S 19/42* (2010.01)
  *G05D 1/00* (2006.01)
  *G05D 1/10* (2006.01)
  *B64U 101/47* (2023.01)

(52) U.S. Cl.
  CPC ............... *B64C 1/40* (2013.01); *B64C 9/00* (2013.01); *B64C 15/14* (2013.01); *B64C 19/02* (2013.01); *B64U 20/60* (2023.01); *B64U 50/18* (2023.01); *B64U 50/34* (2023.01); *G05D 1/101* (2013.01); *B64C 2001/0072* (2013.01); *B64C 2009/005* (2013.01); *B64C 2201/145* (2013.01); *B64U 2101/47* (2023.01); *G01S 19/42* (2013.01)

(58) Field of Classification Search
  CPC .. B64C 1/40; B64C 9/00; B64C 15/14; B64C 19/02; B64C 39/024; B64C 2001/0072; B64C 2009/005; B64C 2201/12; B64C 2201/145
  See application file for complete search history.

(56) References Cited

U.S. PATENT DOCUMENTS

| | | |
|---|---|---|
| 6,311,780 B1 | 11/2001 | Zuev et al. |
| 6,478,240 B1 | 11/2002 | Dorkin et al. |
| 6,558,785 B1 | 5/2003 | Rawal et al. |
| 6,629,670 B1 | 10/2003 | Shah |
| 6,796,382 B2 | 9/2004 | Kaimart |
| 6,871,802 B2 | 3/2005 | Stilwell et al. |
| 6,969,546 B2 | 11/2005 | DiChiara, Jr. |
| 7,083,000 B2 | 8/2006 | Edwards et al. |
| 7,090,029 B2 | 8/2006 | Cleary et al. |
| 7,121,353 B2 | 10/2006 | Setzer |
| 7,210,537 B1 | 5/2007 | McNeil |
| 7,261,165 B1 | 8/2007 | Black |
| 7,284,727 B2 | 10/2007 | Nolan |
| 7,337,156 B2 | 2/2008 | Wippich |
| 7,377,469 B2 | 5/2008 | Cherian |
| 7,478,680 B2 | 1/2009 | Sridharan et al. |
| 7,975,774 B2 | 7/2011 | Akcasu |
| 8,236,413 B2 | 8/2012 | Rivers et al. |
| 8,376,059 B2 | 2/2013 | Reilly et al. |
| 8,678,314 B2 | 3/2014 | Martino Gonzalez et al. |
| 8,714,491 B2 | 5/2014 | Simon et al. |
| 8,746,355 B2 | 6/2014 | Demmitt |
| 8,820,421 B2 | 9/2014 | Rahgozar |
| 8,974,891 B2 | 3/2015 | Riedell |
| 9,017,792 B2 | 4/2015 | Liu et al. |
| 9,051,063 B1 | 6/2015 | Blosser et al. |
| 9,096,314 B2 | 8/2015 | Brotherton-Ratcliffe et al. |
| 9,120,570 B2 | 9/2015 | Hoisington et al. |
| 9,163,581 B2 | 10/2015 | Dyson, Jr |
| 9,347,756 B2 | 5/2016 | Washburn |
| 9,393,450 B2 | 7/2016 | Schueller |
| 9,555,886 B1 | 1/2017 | Hawass |
| 9,586,700 B2 | 3/2017 | Helou, Jr. |
| 9,656,769 B2 | 5/2017 | Mazed et al. |
| 9,713,912 B2 | 7/2017 | Lee |
| 9,750,963 B2 | 9/2017 | Nelson |
| 9,757,918 B2 | 9/2017 | Hillier |
| 9,764,839 B2 | 9/2017 | Whitaker et al. |
| 9,871,186 B1 | 1/2018 | Dyson, Jr. et al. |
| 9,907,987 B1 | 3/2018 | Hossameldin et al. |
| 10,368,401 B2 | 7/2019 | Wen et al. |
| 10,377,558 B2 | 8/2019 | Williams |
| 10,427,785 B2 | 10/2019 | Needham et al. |
| 10,495,028 B1 | 12/2019 | Sipperley et al. |
| 10,501,180 B2 | 12/2019 | Yu |
| 10,569,115 B2 | 2/2020 | Tran et al. |
| 10,639,956 B2 | 5/2020 | Cantrell et al. |
| 2004/0069505 A1 | 4/2004 | Griffin |
| 2005/0139363 A1 | 6/2005 | Thomas |
| 2005/0214067 A1 | 9/2005 | Cherian |
| 2006/0005974 A1 | 1/2006 | Setzer |
| 2006/0162940 A1 | 7/2006 | Pohler |
| 2007/0034387 A1 | 2/2007 | Andersen et al. |
| 2008/0078563 A1 | 4/2008 | Hock et al. |
| 2009/0120653 A1 | 5/2009 | Thomas |
| 2009/0288711 A1 | 11/2009 | Alvi |
| 2009/0321094 A1 | 12/2009 | Thomas |
| 2010/0059236 A1 | 3/2010 | Yee |
| 2010/0065288 A1* | 3/2010 | Akcasu .............. F41G 7/346 169/53 |
| 2010/0203460 A1 | 8/2010 | Formigoni |
| 2015/0114672 A1 | 4/2015 | Yee |
| 2015/0139363 A1 | 5/2015 | Lin et al. |
| 2016/0082298 A1 | 3/2016 | Dagenhart |
| 2016/0265441 A1 | 9/2016 | Pierick et al. |
| 2017/0007865 A1 | 1/2017 | Dor-El et al. |
| 2017/0043872 A1 | 2/2017 | Whitaker et al. |
| 2017/0098748 A1 | 4/2017 | Steutermann |
| 2017/0129699 A1 | 5/2017 | Scofield |
| 2017/0144003 A9 | 5/2017 | Willner |
| 2017/0160740 A1 | 6/2017 | Srivastava et al. |
| 2017/0216646 A1 | 8/2017 | Casamento |
| 2017/0259098 A1 | 9/2017 | Tran et al. |
| 2018/0079888 A1 | 3/2018 | Wiklund et al. |
| 2018/0124945 A1 | 5/2018 | Quenard et al. |
| 2018/0251632 A1 | 9/2018 | Chaffey et al. |
| 2018/0369625 A1 | 12/2018 | Sandahl et al. |
| 2019/0094861 A1 | 3/2019 | Menzel et al. |
| 2019/0127062 A1 | 5/2019 | Witmer |
| 2019/0185163 A1* | 6/2019 | Thomas .............. A62C 37/00 |
| 2019/0337620 A2* | 11/2019 | Thomas .............. B64C 39/024 |
| 2020/0091840 A1 | 3/2020 | Dhyllon |
| 2020/0130831 A1 | 4/2020 | Luca |
| 2020/0140087 A1 | 5/2020 | Fulbright |

FOREIGN PATENT DOCUMENTS

| | | |
|---|---|---|
| CN | 105816981 A | 8/2016 |
| CN | 105833446 A | 8/2016 |
| CN | 105903137 A | 8/2016 |
| CN | 205802476 U | 12/2016 |
| CN | 205891227 U | 1/2017 |
| CN | 106370771 A | 2/2017 |
| CN | 107007961 A | 8/2017 |
| CN | 107376154 A | 11/2017 |
| CN | 207342072 U | 5/2018 |
| CN | 2018/065816 U | 12/2018 |
| CN | 109833575 A | 6/2019 |
| DE | 102011003233 A1 | 8/2012 |
| EP | 1716890 A1 | 11/2006 |
| JP | 2000093536 A | 4/2000 |
| JP | 2003339898 A | 12/2003 |
| JP | 2011103564 A | 5/2011 |
| JP | 2013531789 A | 8/2013 |
| JP | 5323122 B2 | 10/2013 |
| KR | 20180002453 A | 1/2018 |
| KR | 101881550 B1 | 7/2018 |
| TW | 201002383 A | 1/2010 |
| WO | 9832495 A1 | 7/1998 |

(56) References Cited

FOREIGN PATENT DOCUMENTS

WO            0218016 A1     3/2002
WO        2016086068 A1     1/2016

OTHER PUBLICATIONS

PCT Written Opinion of the International Searching Authorigy, dated Feb. 22, 2019 for Adaptive Global Solutions, LLC, International Application No. PCT/US2018/065816, filed Dec. 14, 2018.

Hamood et al. Two-Stage Thermoacoustic Electricity Generator for Waste Heat Recovery. Proceedings of the World Congress on Engineering, vol. II, 2016.

Amit Malewar. A Sonic Fire Extinguisher Extinguish Fire by Sound Waves. Tech Explorist. Published online Jan. 16, 2017.

Karodi et al. Quenching of flames by sound. International Journal of Advance Research and Innovative Ideas in Education, vol. 3, Issue 1, 2017.

Doig et al. Shock Wave Interaction with a Flame. 18th Australasian Fluid Mechanics Conference, 2012.

IFEX I litre impulse firefighting gun 3001: https://www.ifex3000.com/en.impulse-firefighting-gun/1-litre-impulse-firefighting-gun-3001/ Retrieved on Oct. 26, 2003, published Jun. 5, 2016 as per Wayback machine, 3 pages.

Hallmark, Using Backpack Leaf Blowers on Grass Fires, https://www.firefighternation.com/leadership/using-backpack-leaf-blowers-on-grass-fires/#gref, published Sep. 18, 2011, retrieved on Aug. 11, 2023, 11 pages.

\* cited by examiner

FIRE RESISTANT AERIAL VEHICLE FOR SUPPRESSING WIDESPREAD FIRES

CROSS-REFERENCES TO RELATED APPLICATIONS

This application is a national stage application of PCT International Application No. PCT/US2018/065816, filed on Dec. 14, 2018, which claims priority from U.S. Provisional Application No. 62/568,602 filed on Dec. 14, 2017, the disclosure of which is incorporated herein by reference in its entirety.

BACKGROUND OF THE INVENTION

1. Field of the Invention

The present invention relates to fire-extinguishing vehicles, and in particular, aerial vehicles for extinguishing fires over a widespread area.

2. Description of Related Art

Several prior art devices teach the use of a "smart" system for delivering, targeting and the release of fire retardant material. A common feature is the use of GPS, paired with a parachute, sled or glide system, whereupon achieving a pre-determined location or height above the tree line level of a fire, an explosive charge is then employed to discharge its chemical load accordingly. Several are ground impact devices that employ an explosive charge to spread its contents or serves as a failsafe mechanism should the device not explode on impact. Many systems are connected with retractable wings or an air brake to aid in the descent of the projectile or smart bomb, although such are not utilized in actual semi or autonomous flight as an aircraft or projectile navigating the air with an onboard propulsion mechanism. These devices, while utilizing inertia as a delivery mechanism when projected or airborne dropped to a fire environment unfortunately do not employ today's smart technology to think and learn nor have the capacity to effect true flight within the tree line of a fire.

As this is a system and mechanism for the delivery of fire suppressants (retardants, and other) materials, actual fire suppressant and other such materials will not be discussed here.

U.S. Pat. No. 9,393,450 teaches us a method, system, and apparatus for the aerial delivery of fire suppressant comprising of an exterior shell with at least one input port, at least one output port, and at least one pocket. At least two skids affixed to the bottom of the exterior shell and a bladder is formed inside the exterior shell. A detonation cord affixed to the bladder and a detonation device are arranged in the at least one pocket and operably connected to the detonation cord configured to release a liquid contained in the bladder. A detonator device triggers detonator cord releasing fire retardant seed on a target.

One of the limitations here is that it is not a precise delivery mechanism that can maneuver on its own accord to deliver a fire-retardant package.

U.S. Pat. No. 9,120,570 teaches a system and methods for deployment operations from an airborne vehicle are presented. A designated location of a target is received at a flight control system coupled to a location tracking guided container comprising an agent. The location tracking guided container is ejected at an ejection point from the airborne vehicle approximately above the designated location of the target to descend at a descent rate and a descent angle. A calculated path to the designated location is calculated based on the designated location and a current location of the location tracking guided container. The location tracking guided container is aerodynamically guided by a glide control structure to fly along the calculated path from the ejection point to a load release altitude near the designated location of the target. The agent is delivered to the designated location of the target by releasing the agent at the load release altitude near the designated location.

Here too, is a GPS guided system deployed by parachute with a glide control system.

U.S. Pat. No. 8,746,355 teaches a fire extinguishing bomb pre-programmed to detonate at 2-200 feet above the ground or the tree line. It employs a laser or barometric altitude sensor in combination with a GPS-altitude sensor for failsafe detonation with extreme accuracy at the proper altitude. While US Patent Application Publication No. 2017/0007865 teaches a similar but upgrade of U.S. Pat. No. 8,746,355, fitted with a GPS locating device, a position transmitting device and a remote detonating device electronically coupled to the explosive device, that upon impact with the ground will cause detonation of the C4 charge, causing its contents to spread therefrom. It also employs the use of an airbrake system to "ensure the housing unit will fall in an orientation that ensures second end striking the ground" and that it can be detonated within a range of 2-200 feet above the ground or tree line.

The air brake is applicable to steady the device but is not part of a true "flight" system nor deployable to help offset the blast created at the time of detonation. Neither U.S. Pat. No. 8,746,355 nor U.S. Patent Application Publication No. 2017/0007865 can perform autonomous conventional flight activities.

U.S. Pat. No. 7,975,774 teaches a guided fire-retardant-containing bomb comprises a container with retractable wings, tail and elevators having the form factor of a conventional release vehicle, where the control surfaces are coupled via a controller to a GPS with inertial guidance control and an ability to receive external instructions, and a charge core to disintegrate and disperse the fire retardant or water.

While its retractable wings are deployable at the time of launch, there is no indication that such can be retracted for flight below tree top levels, and it has limited "lift" ability. As indicated "Since a single 1,000 lb or even 2,000 lb dose of water or fire-retardant chemical is not enough to put out a large or medium fire, many of the "smart water bombs" may be used in large numbers and in a coordinated manner, . . . " Detonation employs an explosive core, targeting is based upon a preselected height to disintegrate, and its flight is that of a nose heavy glider, as it does not have a propulsion system.

U.S. Pat. No. 7,478,680 teaches an extinguishing device consists of an encapsulated cryogenic projectile with a payload of solidified and frozen mixture of carbon dioxide, nitrogen, combination of gases and compacted solid extinguishing agents. These strategically located and cryogenically stored devices are launched at the outbreak of fire, aerially or terrestrially over a blaze. An embedded explosive charge is detonated at a predetermined and optimum height causing the solidified gases/compacted solid extinguishing agents to be dispersed instantaneously and forcefully over targeted and specified areas.

U.S. Pat. No. 7,261,165 teaches that a housing unit includes two parts that define a fire-smothering chemical storing interior volume. The housing unit is transported to a target area of a forest fire by an aircraft and dropped onto the target area. An explosive charge is located inside the housing unit and is detonated when the housing unit impacts the ground. The explosion associated with the detonated charge separates the two parts of the housing and disperses the chemical from the open housing unit.

Effectiveness may be limited to how far above and lateral to impact the fire retardant can spread and may not be as effective as an airburst vertical fire suppression element U.S. Pat. No. 7,083,000 teaches us a fire extinguishing and fire retarding method is provided comprising the step of confining a fire extinguishing and fire retarding agent in slurry, liquid or gaseous form within a shell wherein the shell comprises such an agent in solid form. An agent such as ice water, or liquid carbon dioxide is useful when employing the shell as "non-lethal" device. The solid shell is sublimable and will burst upon impact or upon exposure to the environmental conditions at the target site to release the contents of the shell as well as the fragments of the shell onto the target site.

U.S. Patent Application Publication No. 20060005974 (the "'974 Publication") teaches an airborne vehicle which is equipped with an extinguishant container for mist extinguishing is specified for efficient firefighting. A detonator which is located on the extinguishant container can be detonated via a fuse. The detonator is attached to the airborne vehicle such that, on firing the extinguishant which is contained in the extinguishant container produces an extinguishant mist. This is an aerial or ground based launchable missile that will provide a mist of water over a targeted fire area, upon detonation using a timed fuse.

When compared to the present invention, the '974 Publication is limited in scope of search and targeting.

Significant advances have been accomplished in the use of aircraft for in general flight and fire-fighting activities.

U.S. Pat. No. 9,750,963 teaches A system for dispersing liquid over a desired location, the system comprising a pressurized tank having a main body, an inlet in fluid communication with the main body for introducing liquid to the main body, an outlet in fluid communication with the main body for dispersing the liquid, and an air inlet for charging air under pressure into the main body, where the improvement comprises providing a diffuser for slowing down pressurized air entering the main body from the inlet.

U.S. Pat. No. 7,284,727 discloses a system and method for aerial dispersion of materials. An aerial dispersion system that may be employed to allow rapid and temporary conversion of aircraft for aerial dispersion purposes, such as aerial fire-fighting. The aerial dispersion systems may be implemented using modular components that may be configured for compatibility with conventional cargo loading and unloading systems of modern aircraft, including side-loading cargo systems of wide body passenger and cargo aircraft having high lift capacities. The aerial dispersion systems may be rapidly installed in a large fleet of high capacity aircraft in response to a wildfire. While a typical 747 commercial aircraft have a gross carrying weight of about 140,000 pounds and is capable of carrying about 13,000 gallons of liquid dispersant material such as water. This is over four times the 3000 gallons carrying capacity of a typical aerial dispersant system aircraft utilized at that time for purposes such as aerial firefighting. This is a pre-Super Global Tanker system, which as with most aircraft converted delivery system it is effective only as to how close it can attack a fire situation from above, the availability of a landing and re-lading area, capacity, the turnaround time between discharge and return to the fire situation, and the number of aircraft that can be deployed.

Global SuperTanker's B747-400, The Spirit of John Muir, incorporates a patented system capable of delivering single or multiple payload drops aggregating over 19,000 gallons (72,000 liters) of water, fire retardant, or suppressant. These fluids can be released at variable rates from the plane's pressurized tanks, producing a tailored response to the firefighting need. This unique ability allows it to make as many as six drops in a single flight, while other aircraft such as the C-130 or BAe-146 must repeatedly land and refuel to achieve the same results.

U.S. Pat. Nos. 9,750,963 and 7,284,727 demonstrate advances for a rapid modular fit of suppressant dispersal materials to large aircraft, whereas the Global SuperTanker is a dedicated aerial fire-fighting platform. The Global SuperTanker can operate two separate, but identical constant flow systems are pressurized which allows for either continuous discharge or up to 8-13 segmented drops. The Global SuperTanker is able to operate within 15 meters of the above or tree top level (whichever is higher at the time).

While significant advances have been made since the 2002 Fire Season which saw the fatal crashes of two air tankers in the United States. The current invention, however, allows the system to work below tree top level, where it can use infra-red data for mapping and AI self-learning/re-programming for fire targeting and suppression.

U.S. Patent Application Publication No. 20170160740 discloses a device that receives a request for a mission that includes traversal of a flight path from a first location to a second location and performance of mission operations, and calculates the flight path from the first location to the second location based on the request. The device determines required capabilities for the mission based on the request, and identifies UAVs based on the required capabilities for the mission. The device generates flight path instructions for the flight path and mission instructions for the mission operations, and provides the flight path/mission instructions to the identified UAVs to permit the identified UAVs to travel from the first location to the second location, via the flight path, and to perform the mission operations at the second location.

U.S. Application Publication No. 2017/0259098 discloses the effective use of acoustic technology to suppress different types of fire by adjusting the frequency of sound waves. It further teaches us that it can be used as a handheld device, placed in a fixed or static location, such as above a kitchen range top, and with the desire of one day being attached to a drone for deployment above a fire situation. However, it does not disclose how the acoustic technology can be adapted for a wildfire.

CN205891227U teaches an unmanned aerial vehicle ("UAV") having a fire-suppression acoustic device and a thermal imaging system attached to the bottom of the vehicle, which thermal imaging system may be used to obtain temperature information for guidance to the target area. However, CN205891227U does not teach how the UAV can perform fire suppression within a fully evolved fire In sum, the prior art does not teach an ordinary skilled artisan to produce a system or method for discharging pressure waves inside a widespread fire to suppress or extinguish fires.

SUMMARY OF THE INVENTION

The present invention employs pressure wave or shockwave in a controlled, discrete, non-destructive aerial blast, alone or combined with other fire extinguishment materials, targeting horizontally, vertically, and in block formation at, above, alongside of, around, through and from within the midst of fire to suppress a wild fire. Using elements from the ambient environment, this invention can generate its electrical and propulsion needs, without the use of a solid, gel or liquid fuel, or other external propellants. When a pressure wave moves across a flame, disturbing its energy and creating a low-pressure system, the flame is moved off its fuel source. This is the non-incendiary method applied here to create the fire suppression, fire extinguishment method of this invention. Utilizing air from the "fire environment," a pressure wave or shockwave created by a non-incendiary mechanism is efficacious in blowing a fire off its fuel source. When combined with a fluid load the intensity of the shockwave is accelerated while atomizing the fluid and additional fire extinguishment material, thereby accentuating the impact of fire suppression. Without leaving the fire situation, it can efficiently continual to recharge and discharge a nondestructive shockwave mechanism, on and in location, constitutes a tactical advantage. With the AI platform, assets can be autonomous or semi-autonomous arrayed in a formation, within and contiguous to the fire creating a blanket, wall or block fire suppression effort, as a drone swarm.

According to a presently preferred embodiment, there is provided an aerial vehicle for extinguishing widespread fires comprises:

(1) a first vessel having an external and interior surface defining a first chamber, the first vessel being made of a first thermal insulating material having a melting point of greater than about 800 degrees Celsius;

(2) a second vessel having an exterior surface and an interior surface defining a second chamber and disposed concentrically and coaxially inside the first chamber of the first vessel, the second vessel being made of a second thermal insulating material having a melting point of greater than about 800 degrees Celsius, the interior surface of the second vessel having an inlet configured to receive and retain compress air in the second chamber, and to selectively discharge the compressed air through an outlet configured to produce a pressure wave to extinguish fires, the first and second thermal insulating materials being configured to resist flame and to provide thermal insulation to maintain an internal temperature of 35° C. or lower in an environment where temperatures range from about 35 degrees Celsius to about 1,650 degrees Celsius;

(3) means for compressing air in the second chamber of the second vessel; and (4) a propulsion system including a thrust vectoring system for propelling the aerial vehicle.

The following description is exemplary in principle and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

LIST OF REFERENCE NUMBERS IN THE DRAWINGS

| Component/Description | Reference number |
| --- | --- |
| Oblique nozzle | 6 |
| High-volume high-pressure air pumps | 8 |
| Subordinate air compression chambers | 10 |
| Bladder | 12 |
| Bladder assist | 14 |
| Pressure wave chamber | 16 |
| Interior chamber made of titanium | 18 |
| Ceramic matric composite/high-heat-extreme-heat Resistant material coating | 22 |
| Blast mitigating material | 24 |
| Shock absorbing material or a shock absorbance system | 26 |
| Flight assembly system | 32 |
| Temperature sensor disposed on the first vessel for sensing temperature of the exterior surface of the vessel | 34 |
| Emergency pressure release | 36 |
| Thrust vector nozzle | 50 |
| Air intake line | 52 |
| Tab | 54 |
| Command Module | 64 |
| Thermal containment system | 74 |
| Fluids or salts onboard containment system | 74 |
| Thermoelectric power generator | 76 |
| Thrust vector system | 82 |
| Effluent line | 86 |
| Servo motor | 88 |
| Optional air filter | 92 |
| Flexible connector | 94 |
| Thrust vector nozzle tip | 96 |
| Flexible backflow preventer webbing | 98 |
| Onboard electronic receiving mechanism | 100 |
| Connector | 104 |
| Power distribution system | 106 |
| Onboard battery charger | 108 |
| Onboard battery | 110 |
| Vibration mechanism | 112 |

-continued

| Component/Description | Reference number |
|---|---|
| Drag reduction surface access door | 114 |
| Air channels | 116 |
| Collection trough | 120 |
| Air pressure relief system | 122 |
| Heat exchange system | 130 |
| Fuselage door | 132 |
| Aerial Vehicle | 200 |
| Recoil stabilizing mechanism | 300 |

DETAILED DESCRIPTION OF THE PRESENTLY PREFERRED EMBODIMENTS

Figure 1:
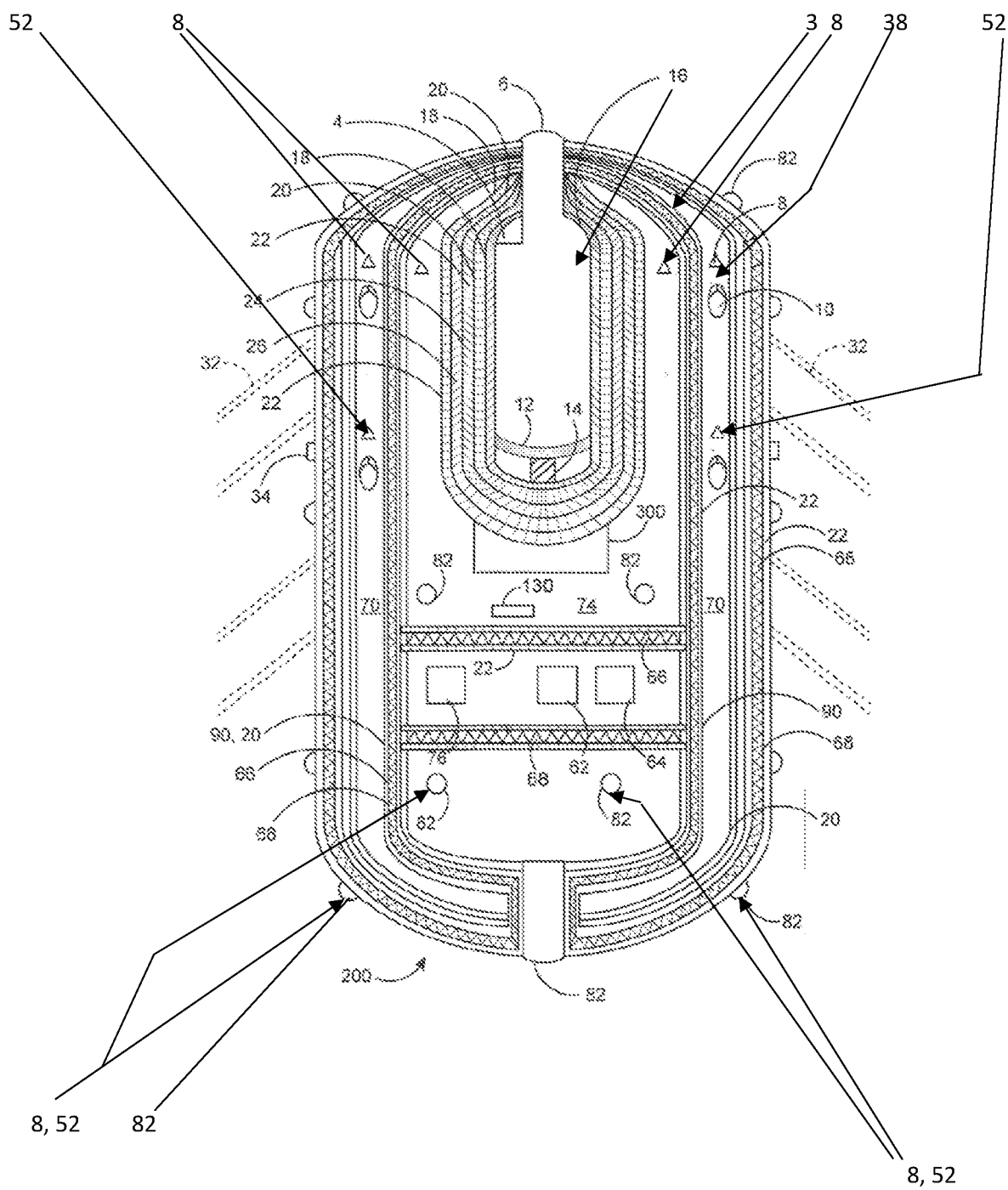
FIG. 1 is a cross-sectional top view of a presently preferred embodiment of a double-hull aerial vehicle of the present invention.

FIG. 1 schematically depicts the double hull design of a presently preferred embodiment of the aerial vehicle of the present invention. In order to accomplish the pressure wave, a pressure wave chamber (16) is configured to receive a volume of air from the external environment ($E_o$), which is compressed therein, and is subsequently forcibly discharged to the external environment at a targeted flame, at a rapid speed through a now opened, preferably oblique, nozzle (6) in a controlled manner preferably using an elastic bladder (12). The pressure wave chamber (16) can be filled directly with air from the external environment preferably using one or more high-volume high-pressure air pumps (8), each equipped with air backflow preventer, and/or preferably using one or more subordinate air pressure wave chambers (10) that will fill the pressure wave chamber (16). The subordinate air pressure wave chamber (10) pumps air from the environment by, preferably, one or more high-volume high-pressure air pumps (8), thereafter pumping same into the pressure wave chamber (16) under high compression through, preferably, one or more separate high-volume high-pressure air pumps (8). Upon arriving at the targeted flame area and compressing a volume of air sufficient to disturb the energy of a target flame, the Command or Control Module (64) suspends filling the pressure wave chamber (16) by the air pumps (8) and the subordinate air pressure wave chambers (10), activates the microelectromechanical devices and actuators (not shown) attached to the bladder assist (14) rapidly accelerate movement of the bladder (12) within the pressure wave chamber (16) from a resting state toward the opening, preferably an oblique nozzle (6), while at the same time causing the opening, preferably an oblique nozzle (6) to open, for release of its contents, under high speed, against the targeted flame area. Upon expulsion of the air contents therein, the Command or Control Module (64) will close the opening (6), cause the bladder assist (14) to retract the bladder (12) to its resting state, then repeat the process.

Beginning with the interior of the pressure wave chamber (16) where air will be compressed therein, and working outward, the material surfaces of the pressure wave chamber (16) is constructed with an interior chamber preferably made of titanium (18); a monocrystalline coating (20); a high-heat-extreme-heat resistant material coating (22) such as a ceramic matric composite, blast mitigating material (24), shock absorbing material or a shock absorbance system (26), a high-heat-extreme-heat resistant material coating (22), a monocrystalline coating (20), and a titanium (18) outer surface. The pressure wave chamber (16) will be repeatedly filled with and discharge uncooled hot air from the external environment ($E_o$) and will experience the highest temperature the interior of the vehicle. Compression of hot air within same may increase temperatures experienced within and by the pressure wave chamber (16). Therefore, titanium is selected as the preferred interior surface (18) of the pressure wave chamber given its low susceptibility to creep at high temperatures, strength durability and having a low thermal (radiation) conductivity. Titanium has a boiling point of 3,287° C., with a melting point of 1,668° C. Applying a titanium alloy provides a metal with high strength and toughness even at extreme temperature. Monocrystalline coatings (20) provide an added layer of strength and durability to the structure at high temperatures. The opening, opening, preferably an oblique nozzle (6) is to be constructed of high-heat/extreme-heat resistant, high tensile strength material.

As depicted here, the bladder (12) and bladder assist (14) mechanism within the pressure wave chamber (16) is constructed of a heat resistant elastic material that will withstand the temperature of hot air that fills, is compressed within, and discharged from the pressure wave chamber (16). The bladder (12) will assist with the compression of air, by resistance, the planned discharge of compressed air from the pressure wave chamber (16) by rapid expansion within the pressure wave chamber (16) when the Command or Control Module (64) discharges the air content within the pressure wave chamber (16) by opening the pressure wave chamber's (16) air discharge opening (6) (preferably, an oblique nozzle).

The aerial vehicle's programming Command or Control Module, avionics package shall include the flight software program, onboard Global Positioning System (GPS), Gyroscopic positioning (including sensors and control), Collision detection and avoidance (LIDAR), Thermal targeting and differentiation, targeting and discharge control programming, internal and external communication system, security system, onboard monitoring systems (pressure wave chamber pump, pressure wave chamber air pressure, propulsion pumps, fluid jacket volume and pressure, and systems check), the internal temperature of the aerial vehicle, air and fluid pressure relief, thrust vector nozzle function and flow, electrical power generation, altimeter, navigation, optional infra-red, near infra-red, and video cameras, antennae, and an optional optical camera. The electronic components should be constructed of such a material and/or covering that will significantly prevent the impact of intense heat generated by the fire environment. The aerial vehicle is designed to operate as an autonomous or semi-autonomous system, subsequent to being programmed and launched by an authorized user or authorized user system (not shown). As each aerial vehicle is fitted with GPS and operational data is transmitted in real-time to and from external monitoring system, an authorized user will have the capability to override operational phase pre-programmed instructions to either reprogram the aerial vehicle's Command Module and/or to manually control operations of the system. Override, reprogramming and manual control may be limited to fire-fighting operations. As used herein, operational phase of the aerial vehicle shall mean when the aerial vehicle is launched/deployed.

With regard to the aerial vehicle's flight assembly system: instead of using an external wing, elevator, rudder or environmentally exposed rotary system, the aerial vehicle is equipped with an adjustable subsurface thrust vector nozzle, connected to, preferably, one or more onboard rapid high pressure high volume pumps, that streams a high volume of air against the surface or subsurface tabs, to control for pitch, yaw, lift, and roll of the aerial vehicle, in like manner as applied to an aircraft or other winged or rotary UAV.

Forward propulsion, hoovering and reverse flight operation of the flight assembly system is electronically controlled by the aerial vehicle's onboard navigation system. The surface or subsurface tabs serve the same function as an aileron, elevator and rudder of a wing based aircraft or drone. The propulsion pumps and the pressure wave chamber pumps are self-clearing, anti-clogging to significantly prevent the build-up of soot and other airborne particulate matter, common to a fire environment from clogging an intake. The propulsion pumps and the pressure wave chamber pumps are connected to the surface of the aerial vehicle, thereby enabling such to extract air from the immediate environment. The base section of the aerial vehicle also houses the rear propulsion port, its propulsion pumps The aerial vehicle's base section is fitted with a closed-loop power source system to harness thermal energy from the (fire) environment that in turn will be used to heat fluids or salts to power an onboard traditional or thermoelectrical generation system during the operational phase of the aerial vehicle. The closed-loop power source system is electronically connected to the Aerial vehicle's Command or Control Module (64) The closed-loop power source system consists of a heat exchange system, that is linked to the surface of the aerial vehicle for the purpose of extracting heat from the external environment, that will transfer heat from the external (fire) environment to a container system that will hold a hot medium with a high temperature. The heat contained in this system may be used to generate electricity by a traditional or thermoelectric generator. The container system that will hold the hot medium with a high temperature may use a heat storage medium that will hold fluids or salts that can be heated from thermal energy transferred from the external environment by the heat exchange system. Where during deployment of the aerial vehicle air temperatures are below the minimum heat threshold required by the heat exchanger to transfer heat to the traditional or thermoelectric generation system and the onboard containment system, the system will then transfer heat contained within the onboard containment system to generate electrical power. The closed-loop power source system's onboard traditional or thermoelectrical generation system is further connected to a battery and battery recharger system. The battery is an additional power source that is activated when the aerial vehicle is programmed for deployment and launch. Electrical power is provided by the battery system when electrical output generated by the electrical generating system is 5% more than the minimum level of electrical power that is required to drive the aerial vehicle. During the deployment phase of the aerial vehicle, the onboard traditional or thermoelectrical generation system, and where necessary, the battery system will provide the required to operate the system. The material construction of the closed-loop power system is such that it will significantly prevent the transfer of heat from within same to other components within the aerial vehicle.

As illustrated in FIG. 1, the air or pressure wave chamber (16) is defined by the interior surface of a cylindrical tube fitted to a half dome section at each end. Fitted to the interior surface of the half dome top and bottom sections of the pressure wave chamber (16) is, preferably, one or more high pressure high volume pump (8). The pump(s) (14), when activated by the Command or Control Module (64), will pressurize the pressure wave chamber (16). The pump is connected to the surface of the aerial vehicle (200) by an air intake line (52), for the purpose of extracting air from the external environment. As further illustrated in FIG. 1, the flight assembly system (32), which includes the wings, elevators, ailerons, and rudder is connected to the vehicle (200). There is also shown the aerial vehicle (200) which includes a flight assembly system (32) including, wings, elevators, ailerons, and rudder, one or more thrust vector nozzles mounted to the exterior surface of the first vessel, one or more pumps connected to said, one or more thrust vector nozzles for ejecting air to effect pitch, yaw, lift and/or roll of the aerial vehicle (200).

Figure 2:
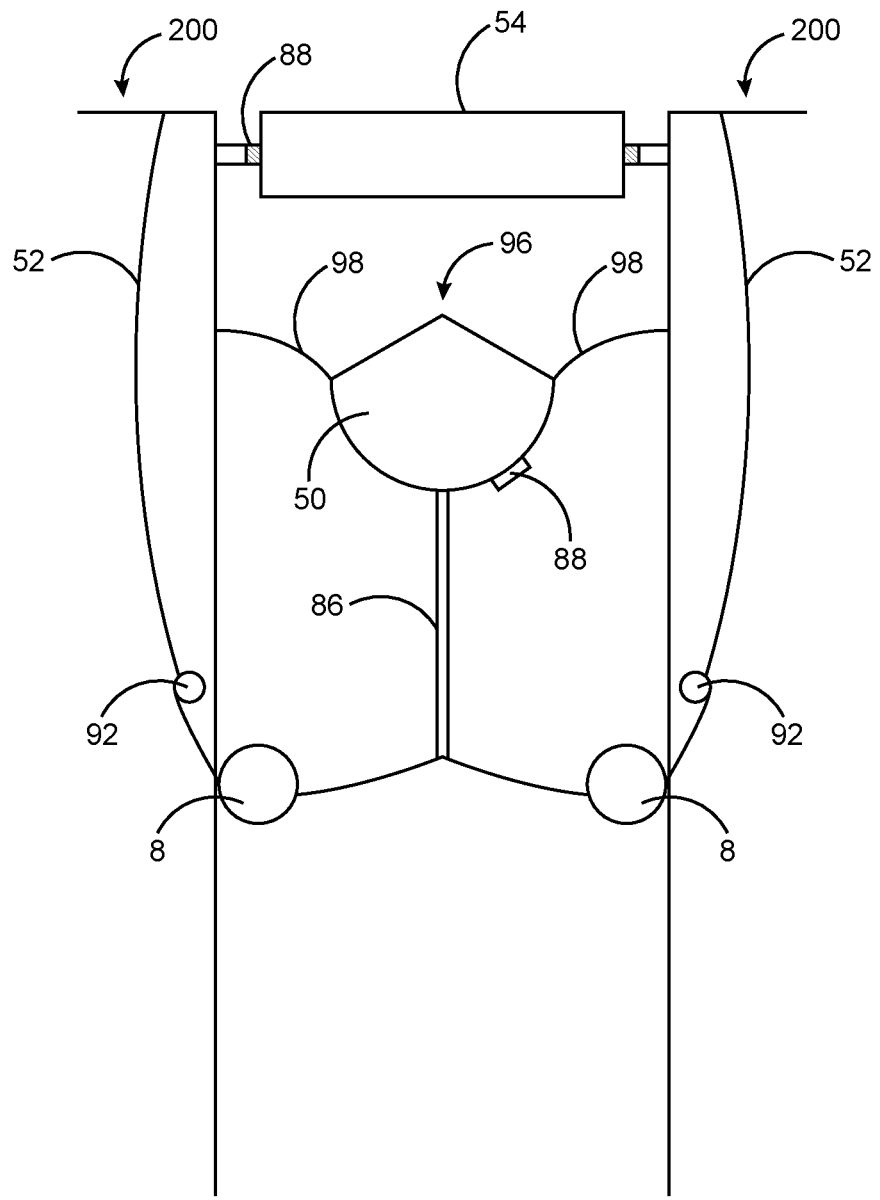
FIG. 2 is a cut-away view of the thrust vectoring system of another preferred embodiment, showing its pumps, intake and effluent lines, gas filtration system, thrust vectoring nozzle, and rotatable tab.

The heat-resistant material covering the outer vessel and concentrically and coaxially disposed inner vessel should be sufficient to significantly prevent the passage of heat from the external fire environment to the various components contained inside the vessels during deployment of the aerial vehicle (200) within or proximate to a fire zone As depicted in FIG. 2, the flight assembly mechanism consists of one micro thrust vector system pumps connected to a thrust vectoring nozzle (50); an air intake line (See, FIG. 2) extending from the non-frangible surface area of the aerial vehicle (200) to the micro thrust vector system pump (8), an effluent air-line connecting the micro thrust vector system (82) pump (8) to a thrust vectoring nozzle (50); a tab(s) fitted to a surface area of the aerial vehicle, connected to a servo motor (not shown) controlling the pivoting mechanism which will allow the tab to be rotated as necessary to maintain flight, lift, hoovering, pitch, yaw and roll. The thrust vectoring nozzles, as incorporated here, are intended to apply the same principle used in a jet engine, except that here, it will funnel a stream of air at high speeds against the rotatable tab. The air intake line (52) extending from the non-frangible surface area of the aerial vehicle (200) to the micro thrust vector system pump (8) (see, FIG. 2) is constructed with an anti-clogging surface material and a particulate matter filtration system, to significantly prevent the buildup of soot or other debris therein.

Thrust vectoring nozzles are used here to control for pitch, roll, and yaw, hoovering, lift, and propulsion for the aerial vehicle (200). Each thrust vectoring nozzle (50) is inked directly to preferably, one or more high volume high speed pumps (8) that extract a high volume of air from the surrounding external environment. The pumps (8) in turn a project volume of air to the thrust vectoring nozzle (50) at a rate required to maintain flight and altitude control of the aerial vehicle (200) above and within the fire zone, and where necessary, to hoover. The actual volume and rate of air to be projected to the thrust vectoring nozzle (50) from the micro thrust vector system pump (8) will be determined based upon aerodynamic requirements. Thrust produced in this manner is the same as would be required where using a thrust vectoring system an aircraft, drone or rocket engine, for flight purposes. The flight assembly mechanisms are electronically linked to the aerial vehicle's (200) Command or Control Module (64). The tab (54) is fitted to a servo motor (88) that controls the pitch of the tab, and is designed move or to rotate in the same manner as an aileron, elevator and rudder assembly of an aircraft. The pressure of air provided by the thrust vectoring nozzle(s) ported against the tab, and the angle the tab is deployed at controls for pitch, roll, yaw, lift, horizontal and vertical rotation, and hoovering as that air stream exits the aerial vehicle (200). The distal end of the thrust vectoring system air intake lines are oriented at the surface of the aerial vehicle, to allow the extraction of air from the external environment. The intake lines are placed at a position and angle significantly far enough from the thrust vectoring system nozzle and tabs, and the flow of air through same, so that air ejected by the thrust vectoring nozzle does not impact upon or otherwise interfere with the air intake system and the ability of the air intake system to function.

The type of pump required to provide the necessary volume of air to provide control pitch, roll, yaw and lift of the aerial vehicle (200) above tree top level, as well as maneuvering within or below tree top level, can readily be determined by those skilled in the art.

The propulsion system of the aerial vehicle is electronically linked by the Command or Control Module (64) to the onboard closed-loop power source system. Electrical power is generated onboard by use of a closed-loop power source system that harnesses heat from the fire environment via a heat exchanger (130) connected to an onboard containment system of heated fluids or salts. In turn the onboard closed-loop power source system is connected to a traditional or thermoelectric power generation system that will generate the electrical power required to operate the aerial vehicle. The size, shape and material of the closed-loop power source system's onboard containment system used will in part be determined by its ability to absorb heat.

The base section and top section respectively house independently operated thrust vectoring nozzles (50). Each thrust vectoring nozzle (50) here is linked to one more high volume high speed pumps (8). These pumps (8) extract. air from the surrounding environment that will be funneled through the thrust vectoring nozzle at high speed, providing propulsion and aeronautical control of the aerial vehicle. The base section and top section contain surface or subsurface horizontal and vertical mounted tabs (54) fitted to a servo motor that control the pitch, roll, elevation and yaw. The tabs (54) are designed to rotate the aerial vehicle in the same manner as would the aileron, elevator and rudder flap assemblies of an aircraft, allowing the aerial vehicle to turn, roll, and lift. Whereas a conventional aircraft wing employs the aileron, elevator and rudder flaps in the respective assembly, the flap assembly is incorporated into the body of the aerial vehicle itself instead of protruding outwardly. As used here in this invention, the thrust vectoring systems will include the tabs (54), pump(s) (8) and the thrust vectoring nozzle(s) (50). As each aerial vehicle will utilize at least two thrust vectoring systems during deployment, each thrust vectoring system may be operated independently, that is separate and apart from any other thrust vectoring system that is part of the invention. Each component noted as operating independently, housed independently, and where aerial vehicles can operate independently, shall mean that each may be operated/function separately. For example, if one thrust vectoring system within an aerial vehicle malfunctions, the remaining thrust vectoring systems may be operated, independently, to continue operations and/or to compensate for the malfunctioning component. Similarly, where aerial vehicles are operating in a "swarm", some or all of the aerial vehicles may operate separate from a single aerial vehicle serving as a central aerial vehicle of, for or within the swarm.

The base and top section are fitted with multiple, independently operated thrust vectoring nozzles (50) where each thrust vectoring nozzle (50) is separately linked to one more high volume high speed pumps (8), and surface or subsurface mounted tab (54) will enhance maneuverability of the aerial vehicle (200). By housing independently operated thrust vectoring nozzles (50) in both the top and bottom sections the front and back of the aerial vehicle (200) can be tilted on its vertical or horizontal axis while hoovering, hoovering motionless, or forward motion. This design will also allow the aerial vehicle to turn or roll on its center axis without changing its latitudinal or longitudinal position.

The base section houses an independent rear propulsion assembly (vectoring nozzle, preferably, one or more high volume high speed pumps, and surface or subsurface mounted tabs). Placing horizontal and vertical tabs (8) here provides greater yaw and pitch maneuverability compared to that of a fixed position rear propulsion engine.

A closed loop power generation system containing a fluid or salt that can be heated, harnesses thermal energy from the fire environment via its connected heat exchanger. The thermal energy of the now heated fluid or salt is used by a connected traditional or thermoelectric generator (76) which will generate the electrical power required to operate the system in addition to and beyond the power produced at the time of Command or Control Module (64) programming and actual launch of the aerial vehicle.

By equipping the thrust vector system and the closed loop power source system with gas filtration system, e.g., to extract Nitrogen and/or Carbon Dioxide from the external environment, the resulting effluent of the aerial vehicle's thrust vectoring system is a fire extinguishment while operating in or proximate to the fire zone. The down wash of the aerial vehicle thereby decreases the Oxygen footprint of the propulsion system.

The top section of the aerial vehicle (200) houses the aerial vehicle's (200) Command or Control Module (64), avionics package which shall include the flight software program, GPS, Gyroscopic positioning (including sensors and control), collision detection and avoidance (LIDAR), thermal targeting and differentiation, targeting and discharge control programming, internal and external communication system, security system, onboard monitoring and diagnostic systems (pressure wave chamber pump[s], pressure wave chamber air pressure, propulsion pumps, fluid jacket volume and pressure, closed-loop power source system, internal and external environment temperature and systems check), air and fluid pressure relief (30), thrust vector nozzle and tab function and flow (11, 12, 13), traditional or thermoelectric generator, internal temperature of the aerial vehicle (33), altimeter, navigation, optional infra-red, near infra-red, and video cameras, antennae, and an optional optical camera.

FIG. 2 illustrates the thrust vector (assembly) system. An air intake line using a self-clearing, anti-clogging material to prevent soot and other airborne particulate matter common to a fire environment from clogging an intake, extends from the surface of the aerial vehicle (200), to a micro thrust vector system pump (8). Where an optional air filtration means is included, as here) (92), to extract air (and/or gases or inert gas) from the (fire) environment, an extension of the air intake line (52) connects the filter system to the micro thrust vector system pump (8). Through these lines the micro thrust vector system pump (8) suctions a high volume of air from the environment, then directs it under high speed through its effluent line (86), to the thrust vector nozzle (50). The effluent line (86) is fitted with a flexible connector (94), allowing for movement of the thrust vector nozzle (50). The thrust vector nozzle's tip (96) is a flexible baffle structure which can expand or constrict, as required by the Command or Control Module (64) to increase or decrease the volume and pressure of air emitted. The thrust vector nozzle (50) is fitted with a servo motor, increasing flexibility of directed air flow, in the same manner as a thrust vector engine of an advanced aircraft. The thrust vector nozzle (50) is also fitted with a flexible backflow preventer webbing (98), to significantly prevent the loss or escape of pressurized air streamed from the thrust vector nozzle to the adjustable tab (54). The adjustable tab (54), which is fitted to servo motors and the surface of the aerial vehicle (200), can be angled by command of the Command or Control Module (64), as required. The ability to angle the tab is in line with the function of the wing, elevator, aileron, and rudder assemblies of an aircraft. The ability to angle the tab and the stream of compressed air from the thrust vector nozzle to the tab enhances an Encasement's maneuverability. The distal end of the aerial vehicle's thrust vectoring system air intake lines are oriented at the surface, to allow the extraction of air from the external environment. The intake lines are placed at a position and angle significantly far enough from the thrust vectoring system nozzle and tabs, and the flow of air through same, so that air ejected by the nozzle does not impact upon or otherwise interfere with the air intake system and the ability of the air intake system to function. As the figures here are two-dimensional, placement of the air intake lines at the surface of the aerial vehicle may appear closer than what actual placement of the air intake line will be.

As used herein, when the Command or Control Module (64) activates the pressure wave chamber pump(s) to rapidly increase air pressure from $X_2$ psi or $X_3$ psi to $X_4$ psi, it will also activate the air brake servo motor(s), extending the air brake outwardly at the time of $X_4$ psi discharge for a pre-determined period of time, creating sufficient drag to counter the impact that an $X_4$ psi discharge that prevailing winds and turbulence within or contiguous to the fire situation would otherwise have upon the trajectory of the aerial vehicle.

As further used herein, where two or more aerial vehicles are at $X_4$ psi within the same blast field, the Command or Control Module (64) will adjust the period of time the air brake is activated to compensate for the additional pressure exerted.

As also used, herein, when an aerial vehicle's sensors detect an approaching shockwave or that an aerial vehicle projected pressure wave or shockwave (e.g., striking a surface) returns in the direction of the aerial vehicle, the Command or Control Module (64) will deploy and adjust its air brakes accordingly to maintain its trajectory, or to move in a course corrective manner.

The air brake is to be constructed of a light weight material and in such a manner as to withstand the pressure exerted $X_4$ psi discharge from the aerial vehicle, $X_4$ psi on blowback, and/or exerted by another encasement proximate to the same blast field, and the pressure necessary to counter movement that otherwise would result from a shockwave, high winds such as fire related thermal updrafts, turbulence and vortices. The air brake can also be applied by the Command or Control Module (64) when accessing the recovery and docking site or system (not shown).

After compensating for a shape charge, shape charge blowback, turbulence, vortices or course corrections, the Command or Control Module will activate the air brake servo motor(s) to retract the air brake.

As used herein, a second option to offset the pressure exert against the aerial vehicle at a $X_4$ psi discharge is the deployment of an additional but separate thrust vectoring system. Here, the additional thrust vector systems are housed between the anterior of the pressure wave chamber's and the vehicle's exterior surface, venting to the aerial vehicle's exterior non-frangible surface. By determining the pressure exerted at $X_4$ psi discharge for $M^\#$ of milliseconds, those skilled in the aerodynamics, shockwave research and usage, can determine the pressure that must be exerted by thrust vectoring systems, as well as the length of time to exert $N^0$ of pressure. Pressure at $N^0$ represents the range of pressure required to maintain the aerial vehicle's trajectory at the time of $X_4$ psi discharge, and at post discharge where the pressure wave or shockwave's impact upon the aerial vehicle has dissipated, returning to or maintaining the aerial vehicle to its pre-$X_4$ psi discharge trajectory.

As further used herein, when the aerial vehicle has achieved its fire target area, trajectory and rotated into its shape charge position, the Command or Control Module (64), while maintaining the aerial vehicle's trajectory through the operation of thrust vector systems, at $X_2$ psi or $X_3$ psi will electronically activate thrust vector systems, so that at the time of $X_4$ psi discharge thrust vector systems will exert sufficient pressure for a pre-determined period $M^\#$ of milliseconds, then reducing such pressure to accordingly to pre-$X_4$ psi discharge levels maintained by thrust vector systems will resume flight and trajectory operations.

As used herein, a third option to offset the pressure exerted at $X_4$ psi discharge against the aerial vehicle is the deployment of compressed air in the same manner of, or similar to, the principals of pneumatic aerodynamic control and drag reduction. To do so, a reinforced line extended from the exterior wall of the aerial vehicle to an air tight controlled door that leads to the interior wall of the pressure wave chamber. Until activated by the Command or Control Module (64) to release air, the unintended release of air is prevented by a backflow preventer valve or door. On demand by the Command or Control Module (64) at $X_4$ psi discharge to release, the pressure wave chamber's backflow preventer and air tight controlled door connected to the reinforced line is opened simultaneously to release a pre-determined amount of air from the pressure wave chamber through the reinforced line, where that amount of air will exit the aerial vehicle along its exterior non-frangible surface. Subsequent to the intended release of the predetermined volume of air as a countermeasure from the pressure wave chamber at the time of $X_4$ psi discharge, the Command or Control Module (64) will then activate the backflow preventer to close.

Figure 8:
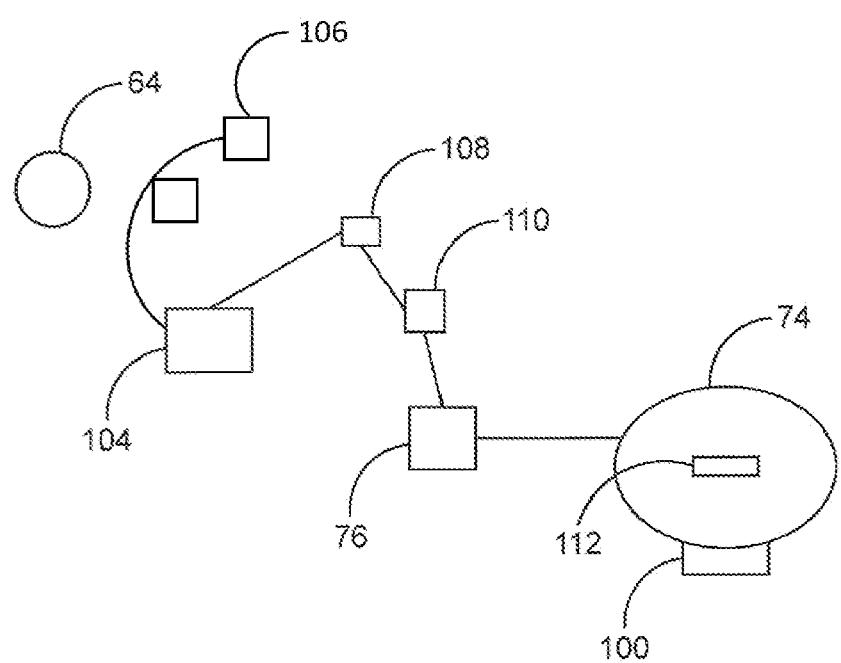
FIG. 8 illustrates a separate view of an onboard alternative system for generating thermal energy and electric power in the inventive aerial vehicle.

FIG. 8 diagrammatically illustrates the aerial vehicle with an alternative method of generating thermal energy and electric power to operate the system. The aerial vehicle's Command or Control Module (64) is electronically linked to an onboard receiving mechanism (100) that when activated can create a vibration of such frequency to create a high rate of vibration, wherein the friction created by same may rapidly generate sufficient friction and resulting thermal energy to heat the fluids or salts within the onboard containment system (74) that will hold a hot medium. Heated thermal energy created in this manner will be used by the onboard traditional or thermoelectric generator system (76) to generate the electrical energy required to operate the aerial vehicle (200).

At the time of pre-launch programming the aerial vehicle (200), the external containment system (not shown) will cause its sending mechanism (not shown) to create and project a signal of a specific frequency (not shown) to the receiving mechanism (100) within the aerial vehicle (200). Upon receiving the signal of a specific frequency (not shown) the aerial vehicle's receiving mechanism (100) is activated.

Activation of the receiving mechanism causes same to vibrate at a very high rate. Excitation created by such vibration will in turn create a high degree of friction and resulting heat up to but not exceeding $T_3^0$. When the Command or Control Module (64) electronically linked temperature monitor (not shown) within the fluids or salts onboard containment system (74) indicates the internal temperature of the contents therein has achieved $T_3^0$, a signal is sent from the aerial vehicle's Command or Control Module (64) to the sending mechanism (not shown), to stop transmission of the signal. The thermal energy produced in this manner may be used to generate electricity by an onboard traditional or thermoelectric generator, providing the electrical power required to operate the aerial vehicle, when the latter is deployed.

The exterior and interior surfaces of the aerial vehicle is to be constructed of a light weight, fire resistant, self-fire extinguishing material that can withstand the extreme temperatures. It incorporates a heat exchange system (130) that will discharge excess heat accumulated within its internal fuselage/component structures to the external environment. The aerial vehicle fitted with a closed-loop power source system to harness the energy from heated fluids or salts to power an onboard traditional or thermoelectric power generation system during the operational phase of the aerial vehicle. The closed-loop power source system is electronically connected to the aerial vehicle's programming, avionics system and the onboard monitoring systems. The closed-loop power source system is electronically connected to the. The closed-loop power source system consists of a heat exchange system that is linked to the surface of the aerial vehicle for the purpose of extracting heat from the external environment. The heat exchange system will transfer heat from the external (fire) environment to a container system that will hold a hot medium (of fluid or salt) with a high temperature. The heat held within this system may be used to generate electricity by a traditional or thermoelectric generator. The container system that will hold the hot medium with a high temperature may use a heat storage medium that will hold fluids or salts that can be heated, is supplied by heat transferred from the external environment by the heat exchange system. Where during deployment of the aerial vehicle's air temperatures are below the minimum heat threshold required by the exchanger to transfer heat to the onboard traditional or thermoelectrical generation system and the onboard containment system, the electrical generation system will then transfer heat contained within the onboard containment system to generate electrical power. The closed-loop power source system's onboard traditional or thermoelectric power generation system is further connected to a battery and battery recharger system. The battery is a power source that is activated when the aerial vehicle is deployed. Electrical power is provided by the battery system when electrical output generated by the traditional or thermoelectric power generating system is at a minimum of no more than 5% of the electrical power required to drive the aerial vehicle's onboard systems. During the deployment phase of the aerial vehicle, the onboard traditional or thermoelectric power generation system, and where necessary the auxiliary battery system, will provide the required electrical power to operate the system. The material construction of the closed-loop power system is such that it will significantly prevent the transfer of heat from within same to other components within the aerial vehicle. A heat resistant material shall mean a material and construction that will significantly prevent the transfer of heat from the external environment into the internal environment of the engineered structure referred to as the aerial vehicle. This shall also mean a material and construction that will significantly prevent the passage, unintended transfer of heat found or contained within, held or located within the interior of a structure of the aerial vehicle, to other areas within the interior of the aerial vehicle. This shall further mean a material and construction that may dissipate or otherwise transfer to the external environment heat introduced in to the fuselage of the aerial vehicle when its fuselage or other doors or openings are opened.

Structurally, the aerial vehicle should be able to withstand the pressure exerted by a fire environment, the pressure exerted by its own $X_4$ psi discharge; $X_4$ psi discharge of other aerial vehicle s and aerial vehicles; operation of air brakes to stabilize aerial vehicle against opposing environmental winds and $X_4$ psi discharges; and, the impact of high speed projectiles within or otherwise commonly associate with an environmental conflagration.

Structurally, the aerial vehicle must be capable of rapidly regenerating $X_4$ psi discharges and continuous deployment for an extended period of time.

The aerial vehicle electronics and monitoring systems include the programming module (64), Artificial Intelligence ("AI") software including drone swarming programming, avionics package which shall include the flight control software program, Gyroscopic positioning (including sensors and control), collision detection and avoidance (LIDAR), thermal targeting and differentiation, targeting and discharge control, internal and external communication system, security system, onboard monitoring and diagnostic systems (pressure wave chamber pump[s], pressure wave chamber air pressure, propulsion pumps, closed-loop power source system, internal and external environment temperature and systems check), air pressure relief, thrust vector nozzle, tab function and flow, traditional or thermoelectric generator, for internal temperature of the aerial vehicle, altimeter, navigation, infra-red, near infra-red, and video cameras, antennae, optical camera, LIDAR, closed-loop power source system, heated fluid or salt onboard containment structure (76), battery system (110), and the heat exchange monitor.

The aerial vehicle is developed for shape charge deployment of a pressure wave or shockwave by compressed air as means for suppressing fire. It is developed for repeated shape charge extinguishment delivery. It is fitted with retractable wings, retractable elevators, and a retractable rudder for extended flight outside of the targeted fire environment and where operating above tree-top level. The aerial vehicle continually monitors its capacity to navigate to a designated recovery and docking area, taking into account its onboard ability to generated sufficient electrical power to operate at temperature below a $T_1°$ thermal environment. The aerial vehicle can deploy its air brake systems to stabilize the its trajectory and to compensate for the pressure exerted at the time of a $X_4$ psi discharge, in order to remain on target; determine when to retract and re-deploy its wing, elevator and rudder assemblies; determine and operate its thrust vectoring system for flight and operational demands.

Where the aerial vehicle's onboard electrical power generation levels beyond the fire environment are less than optimal, the Command or Control Module (64) will divert thermal energy stored in the onboard containment system (74) to the closed-loop power source system's onboard traditional or thermoelectric power generation system (76). While connected to the recovery and docking system this aerial vehicle will deactivate the system for storage or program in new search and deployment data. Where programmed for re-deployment the Command or Control Module (64) will activate the rapid pre-heat mechanism, charging the fluid or salt storage system connected to the closed-loop power source system, up to but not greater than $T_3°$, to provide the electrical power required to operate the aerial vehicle between launch and re-entry to the targeted $T_1°$ fire environment, and initiate recharging of its battery system (110).

The pressure wave chamber that will produce the $X_4$ psi discharge and shockwave is fitted within the hold of the aerial vehicle's fuselage. The pressure wave chamber of the aerial vehicle is comprised of a hardened, non-frangible, cylinder. This cylinder is further comprised of a fixed position exterior wall, a moveable interior wall, and designed to withstand pressurization greater than $X_4$ psi. The pressure wave chamber's exterior wall and its interior wall are further fitted with structural openings, through which air at $X_4$ psi will be released to produce the resulting pressure wave or shock wave as the fire extinguishment. The pressure wave chamber structure may be of a shape other than a cylinder. The design features or components identified in this invention would remain a part of the pressure wave chamber.

The pressure wave chamber is fitted with preferably, one or more rotating interior wall structures with structural openings that will correspond with the exterior wall structural openings. When rotated to open/discharge position by the fitted servo motors, the structural openings of the interior wall (s) will have aligned with the corresponding structural openings of the pressure wave chamber's exterior wall. The pressure wave chamber's interior structural wall is fitted to preferably, one or more servo motors electronically linked to the Command or Control Module (64), that when activated will cause the interior door(s) to rotate along a grooved surface (not shown) to the open or closed position.

The pressure wave chamber is charged by preferably, one or more pumps that extract air from the external environment, through a line that extends from the pump to the exterior surface of the fuselage. The pump is fitted with an air pressure sensor, and an emergency air pressure relief system (122) to significantly prevent over pressurization and/or an unauthorized air pressurization. The pump and the emergency air relief system are fitted with an air backflow preventer, significantly preventing a premature or unauthorized release of air or filtered gas from the pressure wave chamber. The air extraction lines extending from the exterior of the fuselage to the pump, the pump's gas filtration system should be designed with a material that will significantly prevent particulate matter build-up and clogging, and a mechanism to significantly prevent debris access. The pumps, sensors, air intake lines, servo motors, backflow preventers, emergency relief system line(s), and all other components affiliated with the pressure wave chamber are to be constructed or a material and in such a manner as to withstand continuous $X_4$ psi discharge, and to function unimpeded by air pressurization at $X_4$ psi or greater.

Figure 3:
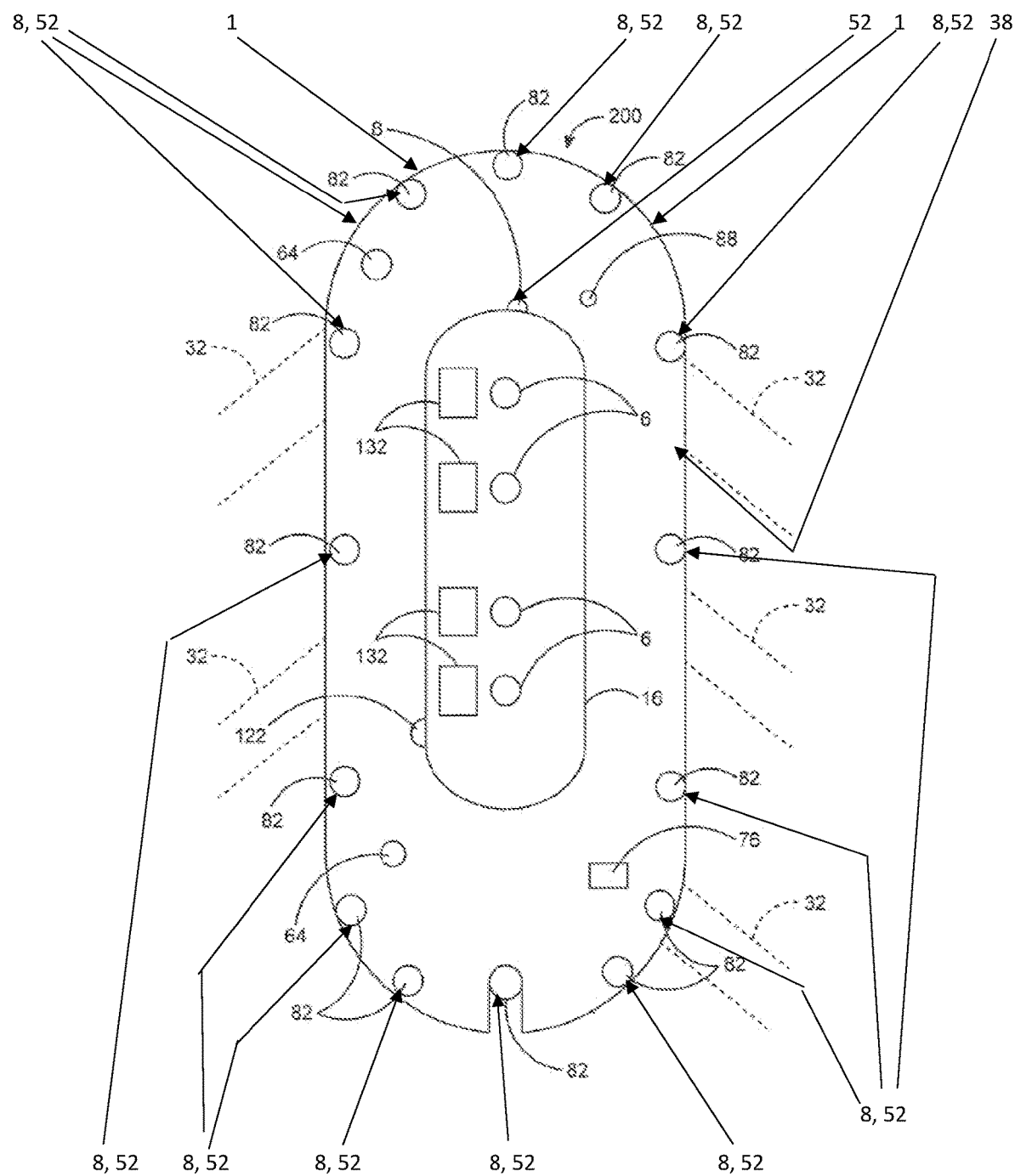
FIG. 3 illustrates a horizontal view of the aerial vehicle with a retractable wing, elevator and rudder assembly, designed for shape charge delivery of a shock wave, showing the pressure wave chamber in the closed position.

As shown in FIG. 3, the fuselage door is in the closed position (132), thereby allowing the pressure wave chamber (16) to be filled.

The pressure wave chamber can be constructed in such a manner as to release compressed air as a pressure wave or shockwave from the upper fuselage, the under belly, the port and/or the starboard areas of the aerial vehicle. To do so the aerial vehicle is fitted with fuselage doors that correspond with the $X_4$ psi discharge position of the pressure wave chamber's interior wall.

Figure 4:
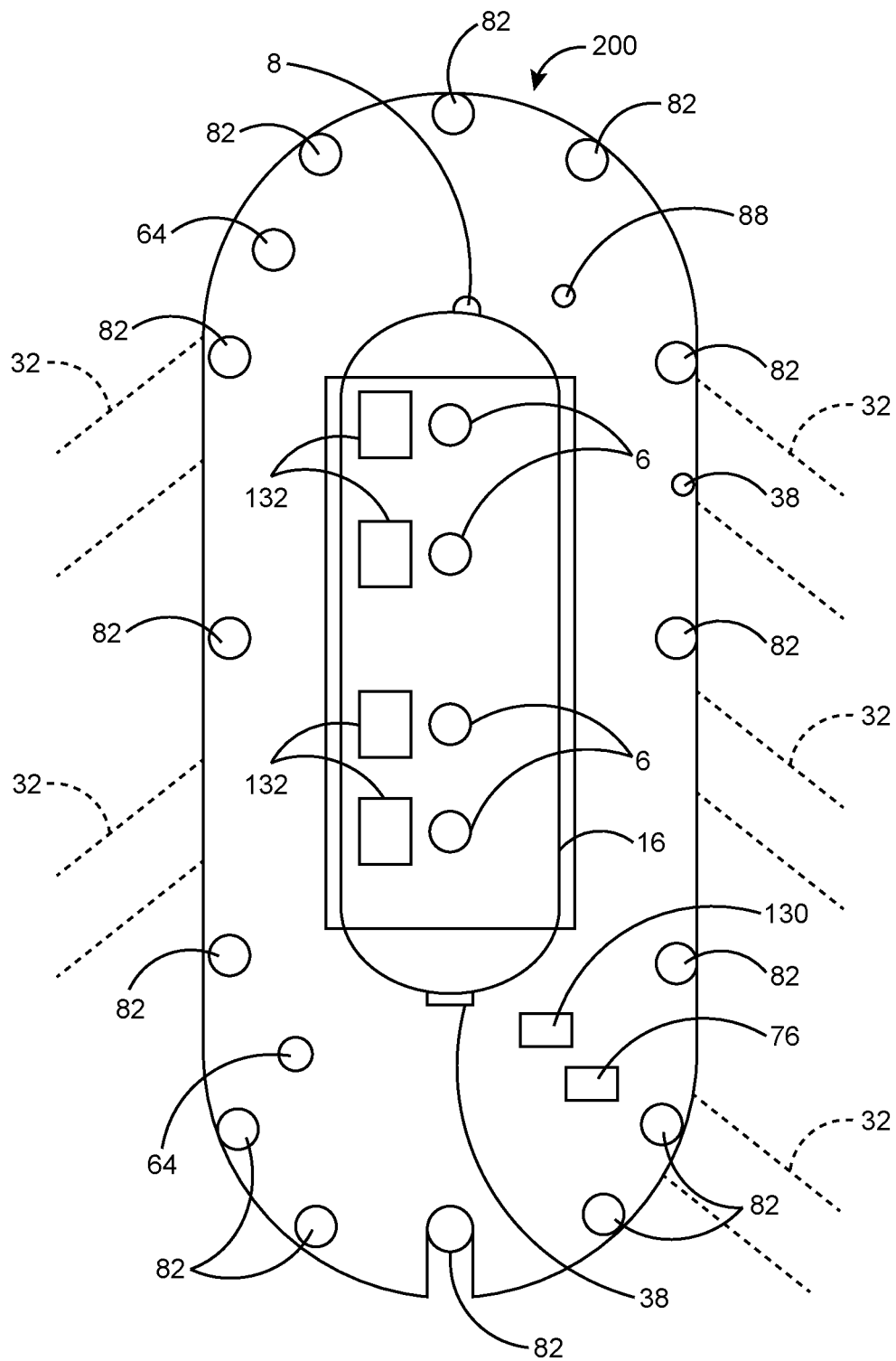
FIG. 4 illustrates a top view of the aerial vehicle with a retractable wing, elevator and rudder assembly, designed for shape charge delivery of a shock wave, showing the pressure wave chamber in the closed position.

As shown in FIG. 4, the fuselage door (132) is in the closed position. When the Command or Control Module (64) activates the servo motor (88) to rotate over the chamber openings (6), preferably an oblique discharge nozzle, compressed air within the pressure wave chamber will be forcibly expelled to the external environment ($E_O$).

Figure 5:
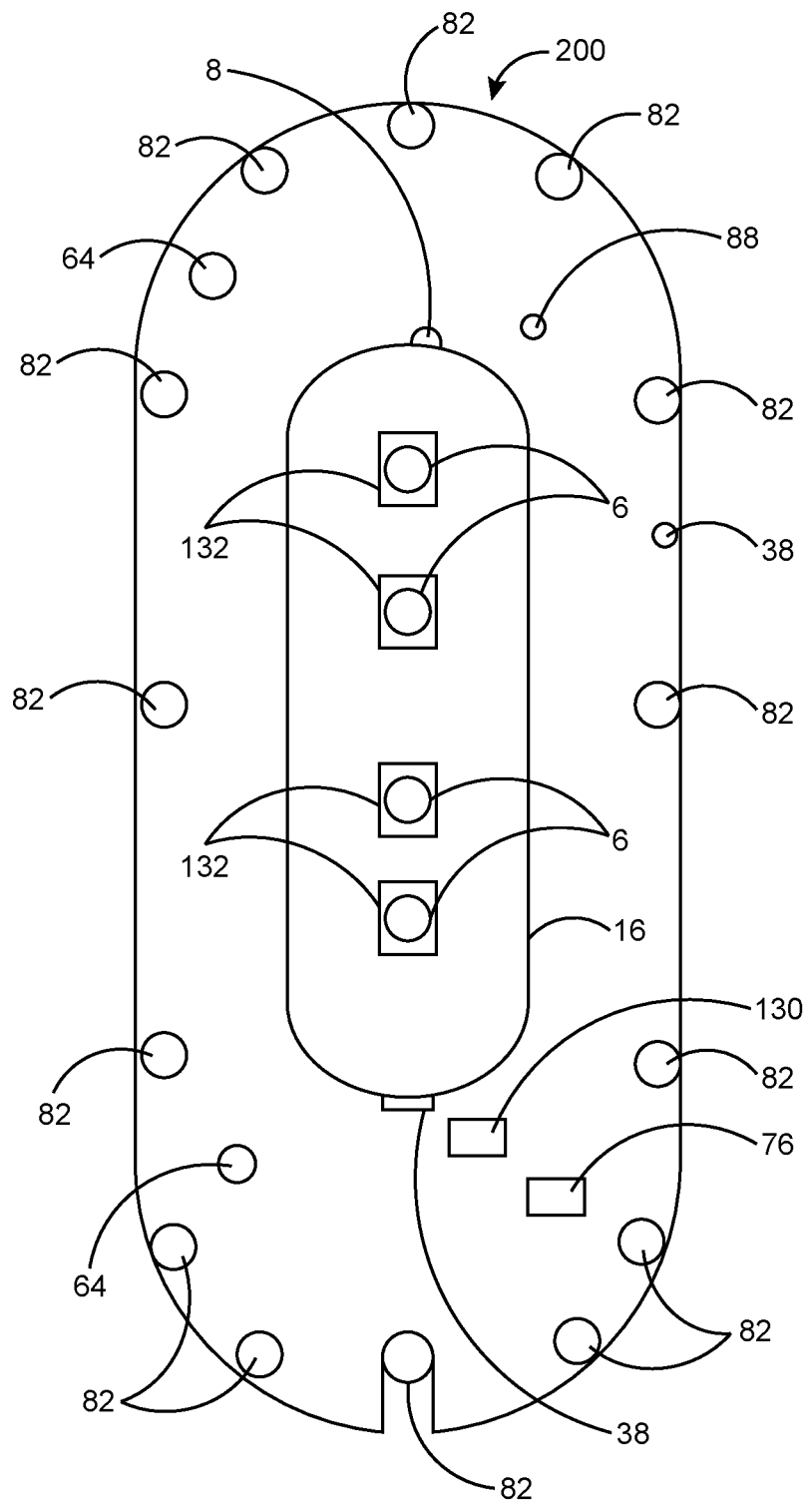
FIG. 5 illustrates a top view of the aerial vehicle, showing its upper fuselage doors in the open position.

As shown in FIG. 5, the pressure wave chamber is designed to release the shape charge through the upper fuselage of the aerial vehicle, by opening the upper fuselage exterior door(s) and rotating the interior wall of the pressure wave chamber to the open position. The upper fuselage exterior doors are fitted to one of more fuselage exterior door servo motors, and a locking mechanism that will secure the fuselage door whether opened or closed. These upper fuselage exterior doors are further fitted with a scrapping edge (not shown), so that when rotated to the closed position the scrapping edge will dislodge debris that may have collected between the fuselage (and the pressure wave chamber when the upper fuselage exterior door was opened for a $X_4$ psi discharge. This scrapping edge will also move collected moisture within the fuselage (between the fuselage's interior structure and the pressure wave chamber), to a debris collection groove for subsequent removal from the aerial vehicle. The interior of the aerial vehicle's hold is fitted with a moisture and debris collection groove. This debris collection groove, electronically connected to the Command or Control Module (64), will open to the external environment to release the collected moisture and debris from the aerial vehicle. This invention is not limited to using the upper fuselage as the release area. The upper fuselage is cited here for illustrative purposes, only.

In advance of a planned $X_4$ psi discharge the Command or Control Module (64) will open the door from the locking system, move the interior pressure wave chamber door along a securing track (not shown) to where it is stowed within the fuselage's hold. The discharge area of the pressure wave chamber is now exposed to the external environment.

The actual number of pressure wave chambers per aerial vehicle, and whether $X_4$ psi discharge will be via the upper fuselage, underbelly, port and/or the starboard area of the aerial vehicle will be determined at the time of manufacture.

Based upon additional data, the Command or Control Module (64) will determine whether or for how long to maintain the upper fuselage door in the open position: e.g., whether the aerial vehicle will deploy the next $X_4$ psi discharge within a predetermined period of time, search for other fire zone targets, route to a recovery and docking area, or await the receipt of an authorized remote command.

Figure 6:
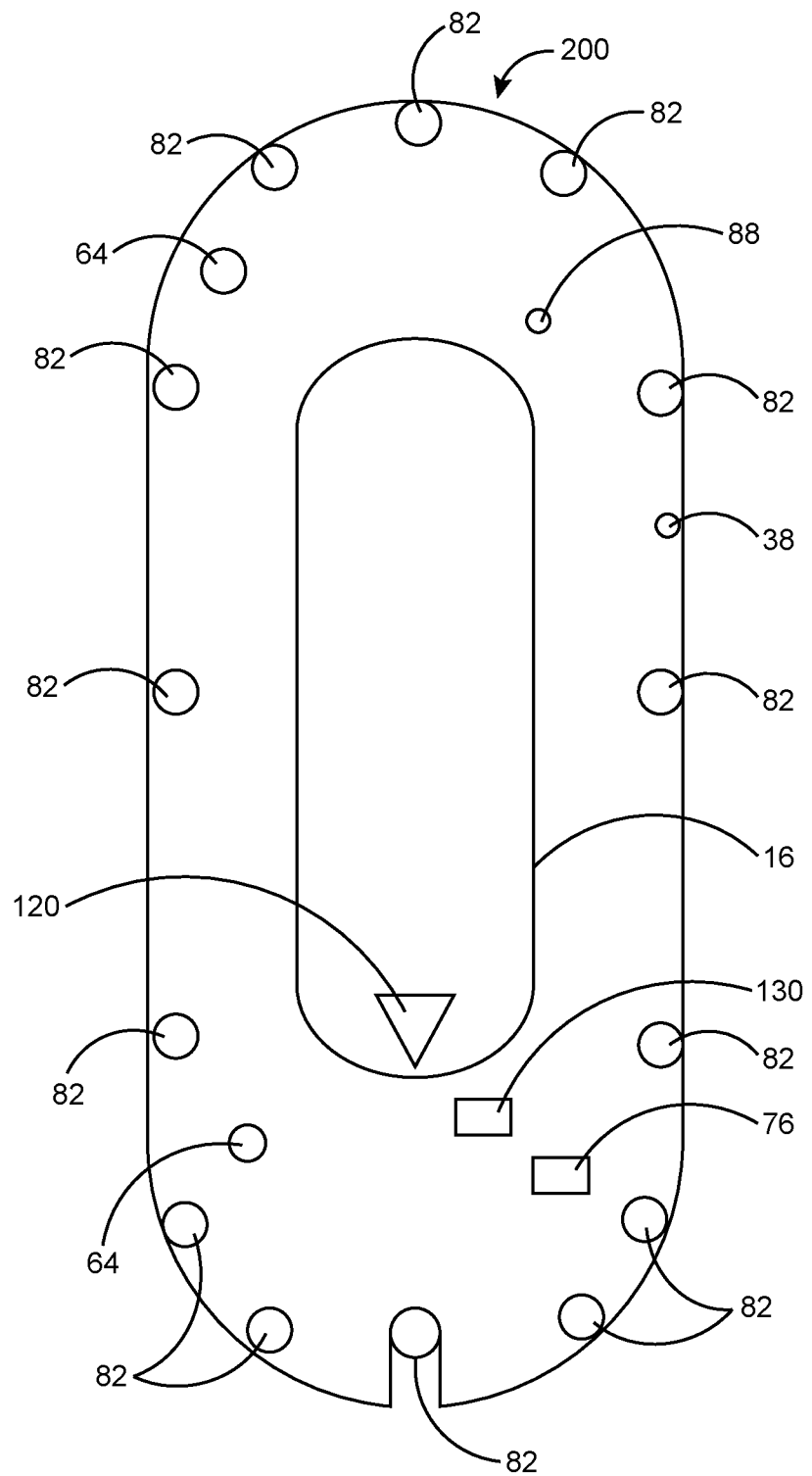
FIG. 6 illustrates a top view of the aerial vehicle, showing the pressure wave chamber with a collection trough.

As shown in FIG. 6, the lateral edges of the interior rotating pressure wave chamber wall are fitted with a scraping edge (not shown) to loosen particulate matter or debris collected within the pressure wave chamber itself, and to push condensation into an exit groove or trough (120) leading to an exterior structural door opening. When the interior door rotates to the closed position (132) it scrapes the exterior wall surface, pushing the loosened particulate matter, debris or moisture into the trough. When trough sensors detect the X volume ($X^v$) of particulate matter, debris or moisture in the trough, the Command or Control Module (64) will pressurize the pressure wave chamber, up to $X_3$ psi, before signaling servos to rotate the interior wall to the open position to clear the interior of the pressure wave chamber. $X^v$ will be determined in the manufacturing process.

As used herein, the Command or Control Module (64) of the aerial vehicle, when activated, will perform a systems diagnostic check of the vehicle's systems and components, determining suitability for deployment before downloading the pre-launch data. That pre-launch data and pre-launch sequence will include flight and trajectory operations, pre-charging of the onboard traditional or thermoelectric generator system (76) and an onboard containment system; flight, trajectory, altimeter, topography data and connect to a real-time satellite link for GPS and topography updates; fire target location, search and targeting data; activate collision detection avoidance, spatial relations sensor, the neural network search and link; pre-charge the pressure wave chamber to $X_2$ psi, while activating the pressure wave chamber pressure and over pressurization monitors, closing the respective air backflow preventer; then on command launching the aerial vehicle via an aerial delivery, VTOL or horizontal take-off and landing ("HTOL"), and deployment of its wing, elevator, and rudder assemblies accordingly.

Figure 7:
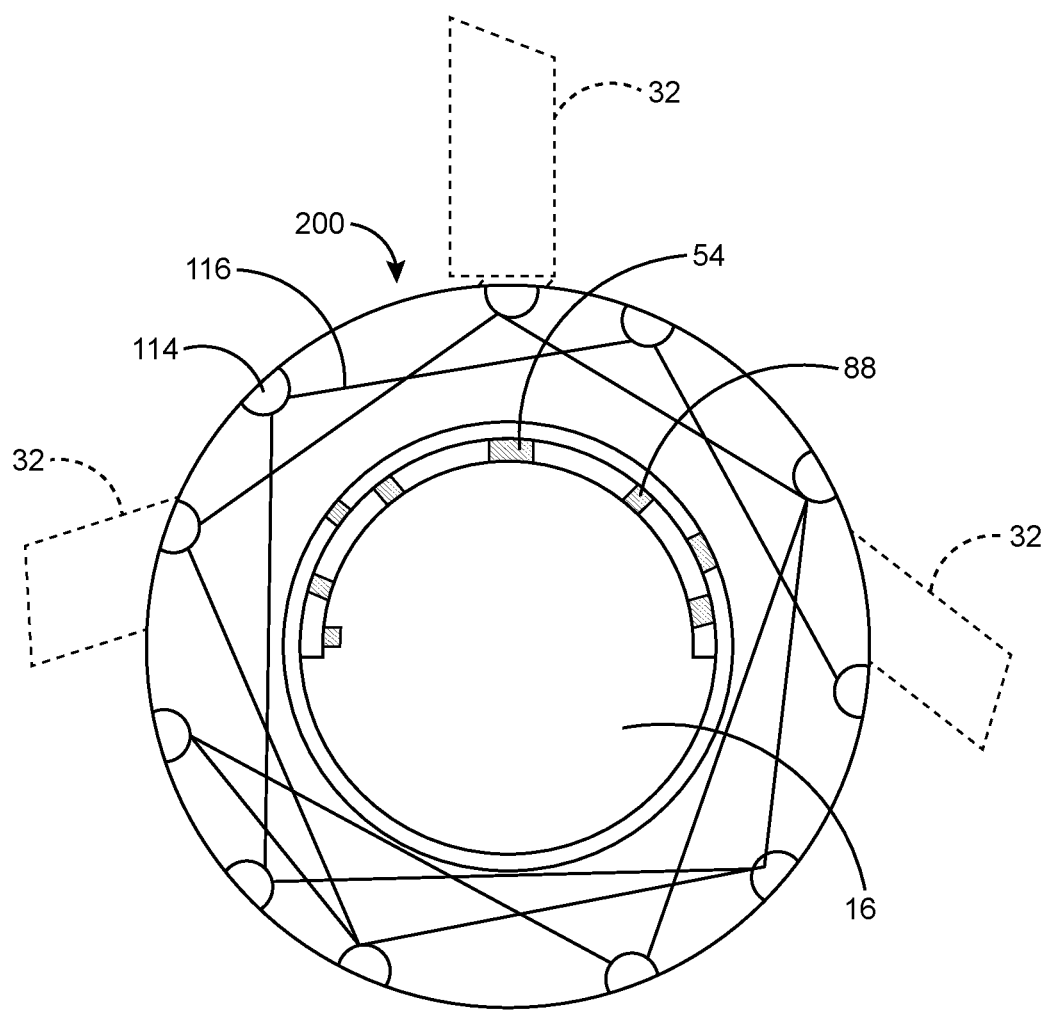
FIG. 7 illustrates a frontal view of the aerial vehicle, showing the pneumatic aerodynamic control and drag reduction fuselage channel system.

FIG. 7 schematically illustrates a front view of the aerial vehicle network of pneumatic aerodynamic control and drag reduction surface access doors (114) and air channels (116). The air channels (116) are housed between the fuselage's exterior surface and the interior wall, which forms the fuselage hold's exterior wall. The interior wall of the pressure wave chamber, connection to a servo motor (88), is in the closed position, indicated by its structural openings as out of alignment with the structural openings of the exterior wall, thereby permitting the compression of air therein. Here, for illustrative purposes, the wing, elevator and rudder assemblies are deployed. The pneumatic aerodynamic control servo motor (88) are electronically linked (not shown) to the Command or Control Module (64). The pressure wave chamber's pumps (14) are connected to the gas filtration filter (not shown) that is connected by an air extraction line (not shown) to the exterior wall of the aerial vehicle's fuselage. Oxygen separated from the extracted gases by the gas filtration system would be released to the environment, away from the down draft or prop wash of the thrust vectoring system. Oxygen levels within the fire zone are not increased by a release in this manner, as the volume of Oxygen so released existed at the time of extracting the gas or inert gas. The distal end of the thrust vectoring system's air intake lines oriented at the exterior surface of the aerial vehicle fuselage, so to allow the extraction of air from the external environment, are placed at a position and angle significantly far enough from the thrust vectoring system nozzle and tabs, the network of pneumatic aerodynamic control and drag reduction surface access doors (114), and air channels (116), so that air ejected by the nozzle does not impact upon or otherwise interfere with the air intake system and the ability of these systems to function.

As further used herein, each pneumatic aerodynamic control and drag reduction fuselage door is fitted with an in-flow and out-flow capability, so that when the Command or Control Module (64) opens the in-flow door (114) to channel air to an exit point, the Command or Control Module (64) opens a corresponding out-flow door, while activating a backflow preventer so that the exiting airflow passing through will not be obstructed. The channels are constructed in such a manner as to create a low-pressure area when air enters at the in-flow door, creating a draft effect, pulling air through to exit the outflow door.

Although the illustration of the pneumatic aerodynamic control and drag reduction references the aerial vehicle.

As used herein, FIG. 8 illustrates the aerial vehicle (200) with an alternative method of generating thermal energy and electric power to operate the system. The Command or Control Module (64) is electronically linked to an onboard electronic receiving mechanism (100) that when activated can create a vibration of such frequency that it will cause another mechanism to vibrate at a high rate of frequency. The frequency operating at a high rate will cause friction between its surfaces and the salt or fluid within the onboard containment system (74) that will hold a hot medium, where it will rapidly heat the salt or fluid contained therein, resulting in a hot medium. The thermal energy created in this manner within the onboard containment system (74) that will hold a hot medium, when transferred to the onboard traditional or thermoelectric generator system (76), will be used by the onboard traditional or thermoelectric generator system to generate the electrical energy required to operate the aerial vehicle.

During pre-deployment the signal is generated by the external programming means (not shown) and transmitted to the aerial vehicle's Command or Control Module (64). The Command or Control Module's programming will transmit a signal to the onboard receiving mechanism (100), the mechanism that will vibrate at a high rate of frequency, and the traditional or thermoelectric generator (76), to initiate electrical power production and distribution. Where (pre-determined) temperature levels within the onboard containment system (74) are below $T_2^o$, the aerial vehicle's Command or Control Module (64) will transmit to the aerial vehicle's onboard receiving mechanism 100 a signal of a specific frequency (not shown) with the embedded identifier (not shown) of an authorized user/operator. When the onboard receiving mechanism 100 receives and accepts the signal of a specific frequency (not shown) it will cause the vibration mechanism (112) within the onboard containment system (74) to vibrate a high rate of speed, creating friction and heat, rapidly heating the hot medium within the onboard containment system (74). Upon achieving an internal temperature of $T_2^o$, the Command or Control Module (64) will then cause, via a heat exchanger, the transfer of thermal energy from within the onboard containment system (74), through a connector (104), to the traditional or thermoelectric generator (76). On command by the Command or Control Module (64) electrical power produced by the onboard traditional or thermoelectric generator (76), will be distributed throughout the aerial vehicle as programmed, by a connection (104) between the onboard traditional or thermoelectric generator (76) and the power distribution system (106). Power distribution is controlled by the Command or Control Module (64). Where the Command or Control Module's (64) monitoring (not shown) of the onboard battery (110) indicates that power levels therein is at or less than 5% more than the minimum level of electrical power that is required to drive the aerial vehicle (700), the Command or Control Module (64) will cause the traditional or thermoelectric generator (76) to distribute electrical power through a connector (104) to the battery charger (108), which in turn will transfer electrical power to the onboard battery (110), recharging the battery (108). The onboard battery (110), as controlled by the Command or Control Module (64), may convey electrical power through a connector (104) to the power distribution system (106). The standard or alternative method of generating thermal energy and electric power to operate the system mentioned above utilizes the same pathway of power generation and distribution, with the exception that the receiving mechanism and the vibration mechanism of the alternative method of generating thermal energy and electric power is replaced by the heat exchange system.

At the time of pre-launch programming the aerial vehicle, the external programming mechanism (not shown) will cause its sending mechanism (not shown) to create and project a signal of a specific frequency (not shown) to the receiving mechanism 100 within the aerial vehicle (700). Upon receiving the signal of a specific frequency (not shown) the aerial vehicle's receiving mechanism 100 is activated.

Activation of the receiving mechanism causes same to vibrate at a very high rate. Excitation created by such vibration will in turn create a high degree of friction and resulting heat, thereby rapidly heating the fluids or salts contained therein, up to but not exceeding $T_3^o$. When the Command or Control Module (64) electronically linked temperature monitor (not shown) within the fluids or salts onboard containment system (74) indicates that the internal temperature of the contents therein has achieved $T_3^o$, a signal is sent from the aerial vehicle's Command or Control Module (64) to the onboard sending mechanism (not shown), to stop the transmission of the signal. The thermal energy produced in this manner may be used to produce electricity by an onboard traditional or thermoelectric generator, providing the electrical power required to operate the aerial vehicle, when the latter is deployed.

Where pre-deployment temperatures of the aerial vehicle fluids or salts onboard containment system (74) declines to a pre-determined $T_1^0$ level, and the aerial vehicle is not deactivated, the external programming mechanism (not shown) will again activate the external sending mechanism (not shown) to create and transmit the electronic signal of a specific frequency (not shown) to the receiving mechanism (100) within the aerial vehicle (700), activating the aerial vehicle receiving mechanism 100 to generate the rapid high frequency vibration required to heat the fluids or salts within the onboard containment system (74), to restore the fluids or salts to the required heated temperature state. $T_2^0$ as defined here, is the pre-determined minimum amount and temperature of thermal energy available within the onboard containment system (74) that will hold a hot medium of fluids or salts, that can be transferred from the onboard containment system (74) to the onboard traditional or thermoelectric generator system (76) for the production of electrical energy required to operate a deployed aerial vehicle, when using this self-contained system. $T_1^0$ as defined here, is applied where thermal energy is drafted from the external (fire) environment, through a heat exchanger system to heat the hot medium of fluids or salts).

Where during deployment the electrical generation capacity and/or the temperature within the onboard containment system (74) that holds a hot medium reaches a temperature of less than $T_2^0$, the aerial vehicle Command or Control Module (64) will activate the onboard receiving mechanism 100 to generate and project a specific signal frequency (not shown) to another mechanism within the onboard containment system (74) that is in contact with the fluids or salts that are contained therein: that mechanism will create the high rate of vibration, whereby the resulting friction between the this mechanism and the fluids or salts cause heat to occur therein the onboard containment system (74) to rapidly restore the fluids or salts contained therein, to the heated level required for sustained deployment of the aerial vehicle. $T_2^0$, as used herein, shall mean the minimum threshold temperature required for the onboard traditional or thermoelectric generator (74) to produce sufficient electrical energy to: operate a deployed aerial vehicle; plus, a temperature of no less than 25% above the minimum the thermal energy required to produce a sufficient quantity of electrical power for the onboard sending mechanism 100 to generate a specific signal frequency that will create the necessary vibration by the onboard sending mechanism 100 to rapidly heat the fluids or salts held within the onboard containment system (74) that will hold a hot medium; and, when necessary, the addition of sufficient electrical energy as required to activate the onboard battery recharger, to recharge the battery to at least 95% of capacity.

The electronic signal transmitted by the Command or Control Module (64) to the receiving mechanism 100 shall contain an embedded signal or code (authorization code, [not shown]), specific to an authorized user or authorized user system. If the signal of the specific sequence is transmitted to and received by the receiving mechanism absent the (presence of the) embedded authorization signal or code, the receiving mechanism 100 will identify such as a rogue signal, and therefore will not activate the vibration mechanism within the onboard containment system (74) that will hold a hot medium of fluids or salts. The intent herein is to significantly reduce or prevent an accidental and an unauthorized heating or otherwise interference with the process and mechanism of heating the fluids of salts held within the onboard containment system (74).

Embodiments of the disclosure may be described herein in terms of functional and/or components and various processing steps. It should be appreciated that such block components may be realized by any number of hardware, software, and/or firmware components configured to perform the specified functions. For the sake of brevity, conventional techniques and components related to fire-suppression, navigation and guidance systems deployment systems, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a non-limiting application, namely, fire-suppression. Embodiments of the disclosure, however, are not limited to such fire-suppression applications, and the techniques described herein may also be utilized in other applications.

As would be apparent to one of ordinary skill in the art after reading this description, the following are examples and embodiments of the disclosure and are not limited to operating in accordance with these examples. Other embodiments may be utilized, and structural changes may be made without departing from the scope of the exemplary embodiments of the present disclosure.

The above description refers to elements or nodes or features being "connected" or "attached" together. As used herein, unless expressly stated otherwise, "connected" means that one element/feature is directly joined to (or directly communicates with) another element/feature, and not necessarily mechanically. Likewise, unless expressly stated otherwise, "attached" means that one element/feature is directly or indirectly joined to (or directly or indirectly communicates with) another element/feature, and not necessarily mechanically. Thus, although FIGS. 1-33 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the present invention(s) has been described herein before and illustrated in the accompanying drawings, with reference to a particular embodiment thereof but it is to be understood that the present invention(s) is not limited thereto but covers all embodiments of the improved fire extinguishing apparatus which would fall within the ambit and scope of the present invention(s) as would be apparent to a man in the art.

From the foregoing it can be seen that a method of fire fighting has been described. It should be noted that the drawings, sketches, diagrams, and figures are not drawn to scale and that distances of and between the figures are not to be considered significant. The foregoing disclosure and showing made in the drawings, sketches, diagrams, and figures shall be considered only as an illustration of the principle of the present invention(s).

While the foregoing description make reference to particular illustrative embodiments, these examples should not be construed as limitations. Not only can the inventive device system be modified for using it as a delivery vehicle for other materials; it can also be modified for launching from varying type of launchers, aircraft and/or other aerial vehicles. Thus, the present invention(s) is not limited to the disclosed embodiments, but is to be accorded the widest scope consistent with the claims below. This is to include but not limited to that the propulsion system may be powered by e.g., turbines, different sources and/or a combination of different sources; that such propulsion system may be external to the body of the inventions presented herein and/or may comprise, and/or that it may be a combination of external and internal systems, components and/or; that the release of pressurized air and/or other gases may be through method or methodology other than and/or in addition to the thrust vector system described herein; placement of the pressure wave chamber, and placement of the pressure wave chamber relative to other components of the invention, as well as the placement of other components to one another; and, other modifications that those skilled in the art, will be obvious.

What is claimed is:

1. An aerial vehicle for extinguishing widespread fires, comprising:
   a. a first vessel having an external surface and an interior surface defining a first chamber, the first vessel being made of a first thermal insulating material having a melting point of greater than 800 degrees Celsius;
   b. a second vessel having an exterior surface and an interior surface defining a second chamber, a pressure wave chamber defined within the second chamber, and wherein the second vessel is disposed concentrically and coaxially inside the first chamber of the first vessel, the second vessel being made of a second thermal insulating material having a melting point of greater than 800 degrees Celsius, the interior surface of the second vessel having an inlet configured to receive and retain compressed air in the pressure wave chamber, and wherein the pressure chamber selectively discharges the compressed air through an outlet configured to produce a pressure wave to extinguish fires; and
   i. the first and second thermal insulating materials being configured to resist flame and to provide thermal insulation to maintain an internal temperature of 35° C. or lower in an environment where temperatures range from 35 degrees Celsius to 1,650 degrees Celsius; and
   c. an air pump for compressing air in the pressure wave chamber of the second vessel; and
   d. a propulsion system including a thrust vectoring system for propelling the aerial vehicle.

2. The aerial vehicle of claim 1, wherein at least one of the first and second vessels is constructed of a ceramic matrix composite material.

3. The aerial vehicle of claim 1, further comprising a mono-crystalline material coating disposed on the interior surface of the first vessel, the exterior surface of the second vessel, and the interior surface of the second vessel.

4. The aerial vehicle of claim 1, further comprising a high-heat-extreme heat resistant material coating disposed on the interior surface of the first vessel, the exterior surface of the second vessel, and the interior surface of the second vessel.

5. The aerial vehicle of claim 1, further comprising an elastic bladder in the pressure wave chamber for compressing air in the pressure wave chamber.

6. The aerial vehicle of claim 1, further comprising an air backflow valve disposed at the inlet for preventing a backflow of compressed air from the pressure wave chamber back through the inlet.

7. The aerial vehicle of claim 1, further comprising a recoil stabilizing mechanism for stabilizing the aerial vehicle during a discharge of the pressure wave.

8. The aerial vehicle of claim 1, wherein the second chamber is cylindrical in shape and having a first end and second end, wherein the first and second ends are dome-shaped.

9. The aerial vehicle of claim 1, further comprising an onboard Global Positioning System (GPS) for tracking a flight path of the aerial vehicle, said onboard GPS being configured to transmit the flight path to a remote location.

10. The aerial vehicle of claim 9, further comprising a flight control system for controlling flight operations of the aerial vehicle.

11. The aerial vehicle of claim 9, further comprising a command module for controlling operations of the air pump and communicating with the flight control system and the onboard GPS.

12. The aerial vehicle of claim 11, further comprising a temperature sensor disposed on the first vessel for sensing temperature of the exterior surface of the vessel.

13. The aerial vehicle of claim 12, further comprising at least one thermoelectric generator for generating electric power for use by the propulsion system, the air pump, the flight control system and the command module, said thermoelectric generator derive electric power from the difference in temperatures of the surfaces as sensed by the sensor.

14. The aerial vehicle of claim 1, further comprising a flight assembly system including wings, elevators, ailerons, and a rudder, one or more thrust vector nozzles mounted to the exterior surface of the first vessel, one or more propulsion pumps connected to the one or more thrust vector nozzles for ejecting air to effect pitch, yaw, lift and/or roll of the aerial vehicle.

* * * * *

UNITED STATES PATENT AND TRADEMARK OFFICE
CERTIFICATE OF CORRECTION

| | |
|---|---|
| PATENT NO. | : 12,129,030 B2 |
| APPLICATION NO. | : 16/771473 |
| DATED | : October 29, 2024 |
| INVENTOR(S) | : Michael S. Thomas |

It is certified that error appears in the above-identified patent and that said Letters Patent is hereby corrected as shown below:

In the Specification

In the CROSS-REFERENCES TO RELATED APPLICATIONS, Column 1, Line 10, should read:
"Application No. 62/598,602 filed on Dec. 14, 2017, the"

In the Claims

In Column 25, Claim 11, Line 12, should read:
"The aerial vehicle of claim 10, further comprising a"

Signed and Sealed this
Tenth Day of December, 2024

Katherine Kelly Vidal
*Director of the United States Patent and Trademark Office*